United States Patent
Nishiwaki et al.

(10) Patent No.: US 7,177,826 B2
(45) Date of Patent: Feb. 13, 2007

(54) SALES SUPPORTING SYSTEM ASSOCIATED WITH NAVIGATION SYSTEM AND METHOD THEREOF

(75) Inventors: Takeshi Nishiwaki, Tokyo (JP); Minoru Nishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 809 days.

(21) Appl. No.: 09/985,851

(22) Filed: Nov. 6, 2001

(65) Prior Publication Data

US 2003/0004826 A1    Jan. 2, 2003

(30) Foreign Application Priority Data

May 11, 2001   (JP) ............................. 2001-141665

(51) Int. Cl.
   *G06Q 30/00*   (2006.01)
(52) U.S. Cl. ...................................... 705/26
(58) Field of Classification Search ................. 705/26, 705/27; 701/200, 201, 202
   See application file for complete search history.

(56) References Cited

U.S. PATENT DOCUMENTS

| | | | | |
|---|---|---|---|---|
| 4,607,331 A | * | 8/1986 | Goodrich et al. | 711/136 |
| 5,568,390 A | * | 10/1996 | Hirota et al. | 701/201 |
| 5,712,788 A | * | 1/1998 | Liaw et al. | 701/209 |
| 5,729,458 A | * | 3/1998 | Poppen | 705/400 |
| 5,878,368 A | * | 3/1999 | DeGraaf | 701/209 |
| 6,496,776 B1 | * | 12/2002 | Blumberg et al. | 701/213 |
| 6,847,935 B1 | * | 1/2005 | Solomon et al. | 705/14 |
| 2001/0018673 A1 | * | 8/2001 | Goldband et al. | 705/27 |
| 2002/0016747 A1 | * | 2/2002 | Razumov | 705/26 |
| 2002/0087384 A1 | * | 7/2002 | Neifeld | 705/10 |
| 2002/0087522 A1 | * | 7/2002 | MacGregor et al. | 707/3 |

FOREIGN PATENT DOCUMENTS

| | | |
|---|---|---|
| JP | 09-097288 A | 4/1997 |
| JP | 10-089982 A | 4/1998 |
| JP | 11-167695 A | 6/1999 |
| JP | 2000-113070 | 4/2000 |
| JP | 2000-222482 | 8/2000 |

\* cited by examiner

*Primary Examiner*—Ronald Laneau
(74) *Attorney, Agent, or Firm*—Sughrue Mion, PLLC

(57) ABSTRACT

To provide a sales supporting system capable of providing information on stores suitable for purchasers without troubling the purchasers. The sales supporting system includes: a store information transmitting unit 101 for transmitting store information including information on at least goods and prices that stores are dealing in, and positions of the stores; a unit 105 for guiding routes to destinations of purchasers; a unit 103 for listing stores that deal in goods for desired purchase according to inputs of the purchasers based on store the information transmitted by the store information transmitting unit; a unit 107 for calculating costs $C_2$ necessary for movements to the destinations via the listed stores respectively; a unit 109 for calculating priority level judging parameters P from sums of the costs $C_2$ and prices of the goods to give priority to stores for purchase in order of smaller priority level judging parameters P; and a unit 111 for notifying the purchasers of store information based on the set priority.

6 Claims, 20 Drawing Sheets

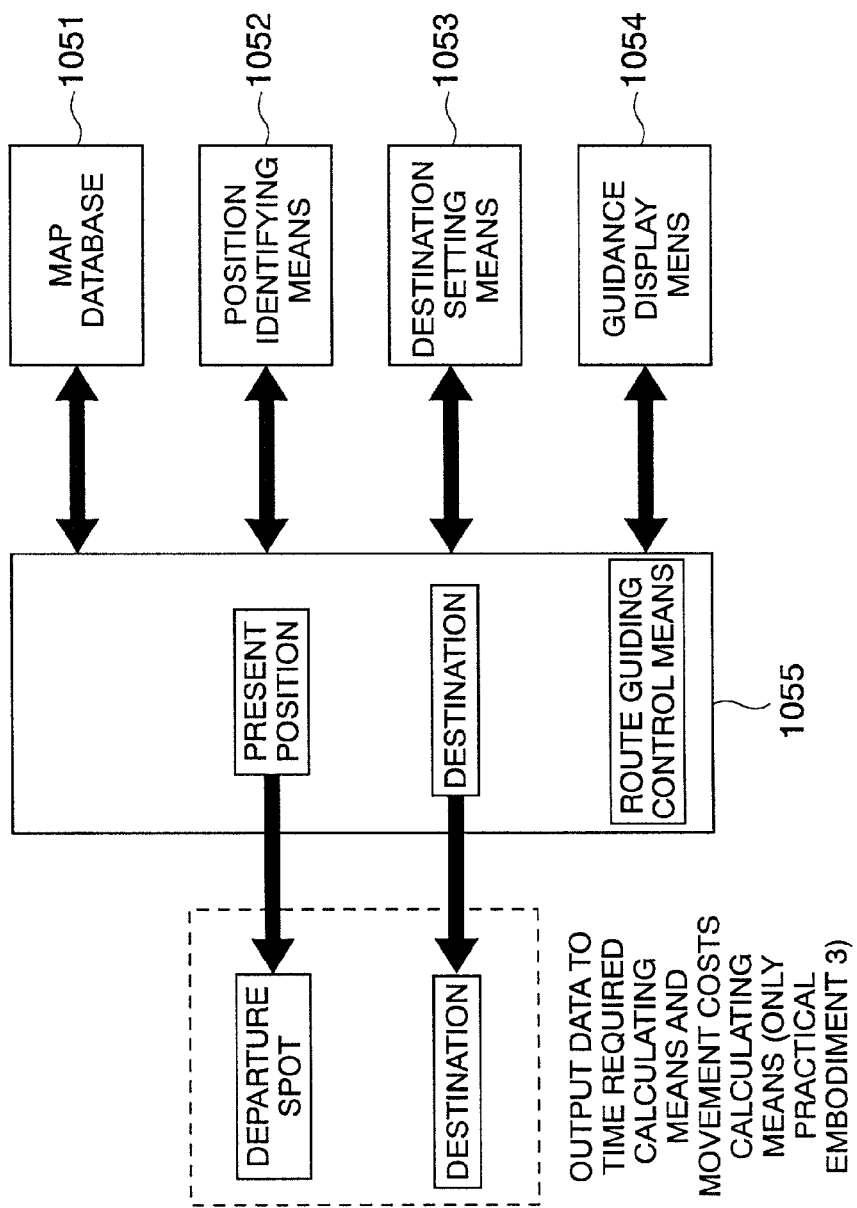

SALES SUPPORTING SYSTEM ASSOCIATED WITH NAVIGATION SYSTEM AND METHOD THEREOF

This application is based on Application No. 2001-141665, filed in Japan on May 11, 2001, the contents of which are hereby incorporated by reference.

BACKGROUND OF THE INVENTION

1. Field of the Invention

The present invention relates to a system to support sales at the time when a purchaser buys goods, by providing information on stores dealing in those goods, in particular, a sales supporting system associated with a navigation system and a method thereof.

2. Description of the Related Art

In recent years, as a result of enhancement in communication system such as the Internet or i-mode of mobile phones, data communication has become common for wide and general use. As a result, such a conduct has become a broad custom that stores disclose information such as kinds of goods the stores are dealing in and prices for respective goods to users of the stores using data communication so that the user can select stores based on the information that the stores disclosed.

In general, when a purchaser selects a store, he/she selects in consideration of availability of goods and their prices, and in addition thereto, in many cases, selects stores to purchase goods in consideration of troubles for a visit to stores, costs (for example, train fares), etc. In addition, in the case where there is a destination having been set for another purpose, it often occurs that, by standing by at stores on the way to the above-described destination, troubles for a visit to stores and costs (for example train fares, etc.) are limited to a smaller amount. In this case, the purchaser selects the store where he/she purchases goods in consideration of troubles for he/she to stop by at the store, extra costs (for example train fares), etc., that will become necessary in case of stopping-by at the store. An example of a process when a purchaser selects stores where he/she is considering stopping-by on his/her way to a destination having been set for another purpose will be described below with reference to FIG. 2.

In Step 101, the purchaser looks into a position of a store that deals in desired goods and prices for the goods with a communication system such as the Internet or an i-mode in mobile phones, etc., or information magazines being generally on the market in towns. In Step 102, a difference in the time required on a route to head for a destination via the store as well as a difference in costs for movement is estimated. In Step 103, in consideration of the price for the goods investigated in Step 101 and the difference in the time required or the costs having been estimated in Step 102, decision making on whether or not to purchase the goods is executed. In the case where decision making for a purchase is executed in Step 103, he/she visits the store to purchase the goods in Step 104. On the other hand, in the case where decision making not to purchase is executed in Step 103, decision making on whether or not investigation on stores should be continued in Step 105, and if the investigation on the stores should be continued, he/she returns to the process of Step 101. On the other hand, if there is no intention to investigate on stores, purchase of goods is given up and the step comes to an end.

It will be troublesome or trouble a purchaser much for the purchaser to decide on a store to purchase goods through a process as described above. For example, in the procedure of Step 101, the purchaser looks into the position of the store that deals in the desired goods and the prices for the goods with the communication system such as the Internet or the i-mode in mobile phones, etc., or information magazines being generally on the market, but in order to select out necessary information from a variety of pieces of information on a number of stores, searching needs to be repeated a certain number of times and incurs troubles.

In the procedure of Step 102, a difference in the time required on the route to head for the destination via the store as well as a difference in costs for movement is estimated, but in order for the purchaser to execute estimation directly, it is necessary for the purchaser to be familiar with maps and information on transportation systems to a certain extent, and in the case where the purchaser is not an expert on maps and information on transportation systems, it is difficult to execute the above-described estimation. There is also a method of executing estimation with information publicized in road maps and time tables, but it requires extreme troubles.

Moreover, as a means for obtaining information for estimation, there is a method of using a navigation system and the like that has recently been put into practical use. The navigation system is a system to calculate and guide a route or a time required from a certain spot to another spot as well as costs for movement, etc., and for example a car navigation system installed in automobiles and a system for executing route guidance with a mobile phone terminal and the like have become available for practical use. With the navigation system, a route or a time required as well as costs for movements can be calculated comparatively easily. However, in order to calculate an increment of a time required via the store and an increment of the costs required for movements, the purchaser needs to search for at least two or more routes with the navigation system, which is troublesome.

It could come to a purchaser's mind on purchasing of goods while he/she is driving an automobile or walking, but in the case where the purchaser is driving an automobile or in the case where he/she is walking, it is in fact impossible to select stores subject to troublesome operations as described above, and thus the purchaser cannot select a more suitable store with information such as kinds of goods that the store is dealing in and the prices for respective goods.

SUMMARY OF THE INVENTION

The present invention is intended to solve the problems described above, and has for its object to provide a sales supporting system associated with a navigations system and a method thereof capable of providing information on stores suitable for a purchaser without troubling the purchaser.

Bearing the above object in mind, according to a first aspect of the present invention, there is provided a sales supporting system associated with a navigation system to provide store information, the sales supporting system comprising: store information transmitting means for transmitting store information including information on at least goods and prices that stores are dealing in, and positions of the stores; means for guiding routes to destinations that purchasers set optionally; store listing means for listing stores that deal in goods for desired purchase according to inputs of the purchasers based on the store information transmitted by the store information transmitting means; means for calculating costs $C_2$ necessary for movements to the destinations via the listed stores respectively; priority setting means for calculating priority level judging parameters P from sums of the costs $C_2$ and prices of the goods to give higher priority to stores for purchase in order of smaller priority level judging parameters P; and means for notifying the purchasers of store information based on the set priority.

According to a second aspect of the present invention, there is provided a sales supporting system associated with a navigation system to provide store information, the sales supporting system comprising: store information transmitting means for transmitting store information including information on at least goods and prices that stores are dealing in, and positions of the stores; means for guiding routes to destinations that purchasers set optionally; store listing means for listing stores that deal in goods for desired purchase according to inputs of the purchasers based on the store information transmitted by the store information transmitting means; means for calculating predicted values of required times $T_2$ necessary for movements to the destinations via the listed stores respectively; priority setting means for calculating priority level judging parameters P from the predicted values of required times $T_2$ to give higher priority to stores for purchase in order of smaller priority level judging parameters P; and means for notifying the purchasers of store information based on the set priority.

According to a third aspect of the present invention, there is provided a sales supporting system associated with a navigation system to provide store information, the sales supporting system comprising: store information transmitting means for transmitting store information including information on at least goods and prices that stores are dealing in, and positions of the stores; means for guiding routes to destinations that purchasers set optionally; means for calculating costs $C_1$ necessary for movements to the destinations and predicted values of required times $T_1$ necessary for movements to the destinations; store listing means for listing stores that deal in goods for desired purchase according to inputs of the purchasers based on the store information transmitted by the store information transmitting means; means for calculating costs $C_2$ necessary for movements to the destinations via the listed stores respectively and the predicted values of required times $T_2$ necessary for movements to the destinations via the listed stores respectively; means for calculating priority level judging parameters $P_c$ on costs, in the case where a route undergoes changes, based on sums of balances between the costs $C_2$ subject to route changes and the costs $C_1$ prior to route changes and prices of the goods; means for calculating priority level judging parameters $P_t$ on time from increased portions of required times given by the required times $T_1$ and $T_2$; priority setting means for calculating comprehensive priority level judging parameters P according to a formula $P=W_c \times P_c + W_t \times P_t$ with weighting $W_c$ toward priority levels on costs and weighting $W_t$ toward priority levels on time that are set in advance, to give higher priority to stores for purchase in order of smaller comprehensive priority level judging parameters P; and means for notifying the purchasers of store information based on the set priority.

In a preferred form of the third aspect of the present invention, the sales supporting system further comprises means for enabling the purchasers to set both or either one of weighting $W_c$ toward priority levels on costs and weighting $W_t$ toward priority levels on time in accordance with situations.

In another preferred form of the first through third aspects of the present invention, the store information transmitting means comprises means for setting prices based on positions of the purchasers.

In a further preferred form of the first through third aspects of the present invention, the store information transmitting means transmits store information through a server that is brought into connection with a general-purpose data communication system.

In a still further preferred form of the first through third aspects of the present invention, the store information transmitting means transmits store information through a narrow area communication apparatus that is provided on a movement route in the vicinity of the stores.

In a yet further preferred form of the first through third aspects of the present invention, the store listing means comprises store information storage means for storing the store information transmitted from the store information transmitting means, and the store listing means lists stores that are dealing in goods for desired purchases from the store information stored in the store information storage means.

Preferably, the store information storage means comprises: means for counting a lapsed time from the time when store information is transmitted from the store information transmitting means or from the time when the store listing means receives store information; and means for disposing of, among the store information stored, pieces of store information for which the lapsed time exceeds a threshold value set in advance.

Preferably, the store information transmitting means transmits a period of validity on store information together with the store information, and the store information storage means comprises means for storing the period of validity on store information together with the store information and disposing of, among the store information stored, pieces of store information for which the period of validity is exceeded.

Preferably, the store information storage means comprises: means for counting distances that the purchasers move from the time when the store information is transmitted from the store information transmitting means or from the time when the store listing means receives the store information; and means for disposing of, among the store information stored, pieces of store information for which the distances exceed a threshold value set in advance.

Preferably, the sales supporting system further comprises means for specifying current positions of the purchasers. The store information storage means comprises: means for giving distances between the current positions of the purchasers and the stores based on information on the current positions of the purchasers, which are given by the means for specifying current positions of the purchasers, and positions of the stores included in the store information; and means for deleting, among the store information stored, pieces of store information for which the distances exceed a threshold value set in advance.

Preferably, the store information storage means comprises means for deleting, among the store information currently stored, the oldest pieces of information in terms of received time thereof from storage when a region to store information is fulfilled so as to store newly received pieces of store information.

Preferably, the sales supporting system further comprises means for specifying current positions of the purchasers. The store information storage means comprises: store-to-purchaser distance calculation means for giving distances between the current positions of the purchasers and the stores based on information on the current positions of purchasers, which are given by the means for specifying current positions of the purchasers, and positions of the stores included in the store information; means for comparing the largest distance among the distances of the currently stored store information given by the store-to-purchaser distance calculation means with the distance of newly received store information given by the store-to-purchaser distance calculation means when a region to store information is fulfilled; and means for deleting from storage a piece of information of the largest distance given by the store-to-purchaser distance calculation means among the distances of the store information currently stored so as to store newly received store information in the case where the distance of the newly received store information is smaller than or equal to any of the distances of the store information currently stored.

Preferably, the sales supporting system further comprises: means for confirming purchase intentions of the purchasers; booking fare charging means for charging booking fares to the purchasers based on the purchase intentions of the purchasers; and booking fare charging certifying means for certifying to stores that booking fares are already charged to the purchasers who visited the stores.

Preferably, the booking fare charging means comprises means for setting periods of validity of bookings at the time of charging, and the booking fare charging certifying means comprises means for certifying that bookings are within the periods of validity.

According to a fourth aspect of the present invention, there is provided a sales supporting method associated with a navigation system to provide store information, the method comprising: a step of transmitting store information including information on at least goods and prices that stores are dealing in, and positions of the stores; a step of guiding routes to destinations that purchasers set optionally; a step of listing stores that deal in goods for desired purchase according to inputs of the purchasers based on store information transmitted by the store information transmitting process; a step of calculating costs $C_2$ necessary for movements to the destinations via the listed stores respectively; a step of calculating priority level judging parameters P from sums of the costs $C_2$ and prices of the goods to give higher priority to stores for purchase in order of smaller priority level judging parameters P; and a step of notifying the purchasers of store information based on the set priority.

According to a fifth aspect of the present invention, there is provided a sales supporting method associated with a navigation system to provide store information, the method comprising: a step of transmitting store information including information on at least goods and prices that stores are dealing in, and positions of the stores; a step of guiding routes to destinations that purchasers set optionally; a step of listing stores that deal in goods for desired purchase according to inputs of the purchasers based on the store information transmitted by the store information transmitting step; a step of calculating predicted values of required times $T_2$ necessary for movements to the destinations via the listed stores respectively; a step of calculating priority level judging parameters P from the predicted values of required times $T_2$ to give higher priority to stores for purchase in order of smaller priority level judging parameters P; and a step of notifying the purchasers of store information based on the set priority.

According to a sixth aspect of the present invention, there is provided a sales supporting method associated with a navigation system to provide store information, the method comprising: a step of transmitting store information including information on at least goods and prices that stores are dealing in, and positions of the stores; a step of guiding routes to destinations that purchasers set optionally; a step of calculating costs $C_1$ necessary for movements to the destinations and predicted values of required times $T_1$ necessary for movements to the destinations; a step of listing stores that deal in goods for desired purchase according to inputs of the purchasers based on the store information transmitted by the store information transmitting step; a step of calculating costs $C_2$ necessary for movements to the destinations via the listed stores respectively and predicted values of required times $T_2$ necessary for movements to the destinations via the listed stores respectively; a step of calculating priority level judging parameters $P_c$ on costs, in the case where a route undergoes changes, based on sums of balances between the costs $C_2$ subject to route changes and the costs $C_1$ prior to route changes and prices of the goods; a step of calculating priority level judging parameters $P_t$ on time from increased portions of required times given by the required times $T_1$ and $T_2$; a step of calculating comprehensive priority level judging parameters P according to a formula $P = W_c \times P_c + W_t \times P_t$ with weighting $W_c$ toward priority levels on cost and weighting $W_t$ toward priority levels on time that are set in advance, to give higher priority to stores for purchase in order of smaller comprehensive priority level judging parameters P; and a step of notifying the purchasers of store information based on the set priority.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 20 is a view illustrating the operation of a means for route guiding in the second and third embodiments of the present invention.

DESCRIPTION OF THE PREFERRED EMBODIMENTS

Now, preferred embodiments of the present invention will be described below while referring to the accompanying drawings.

Embodiments 1

Figure 1:
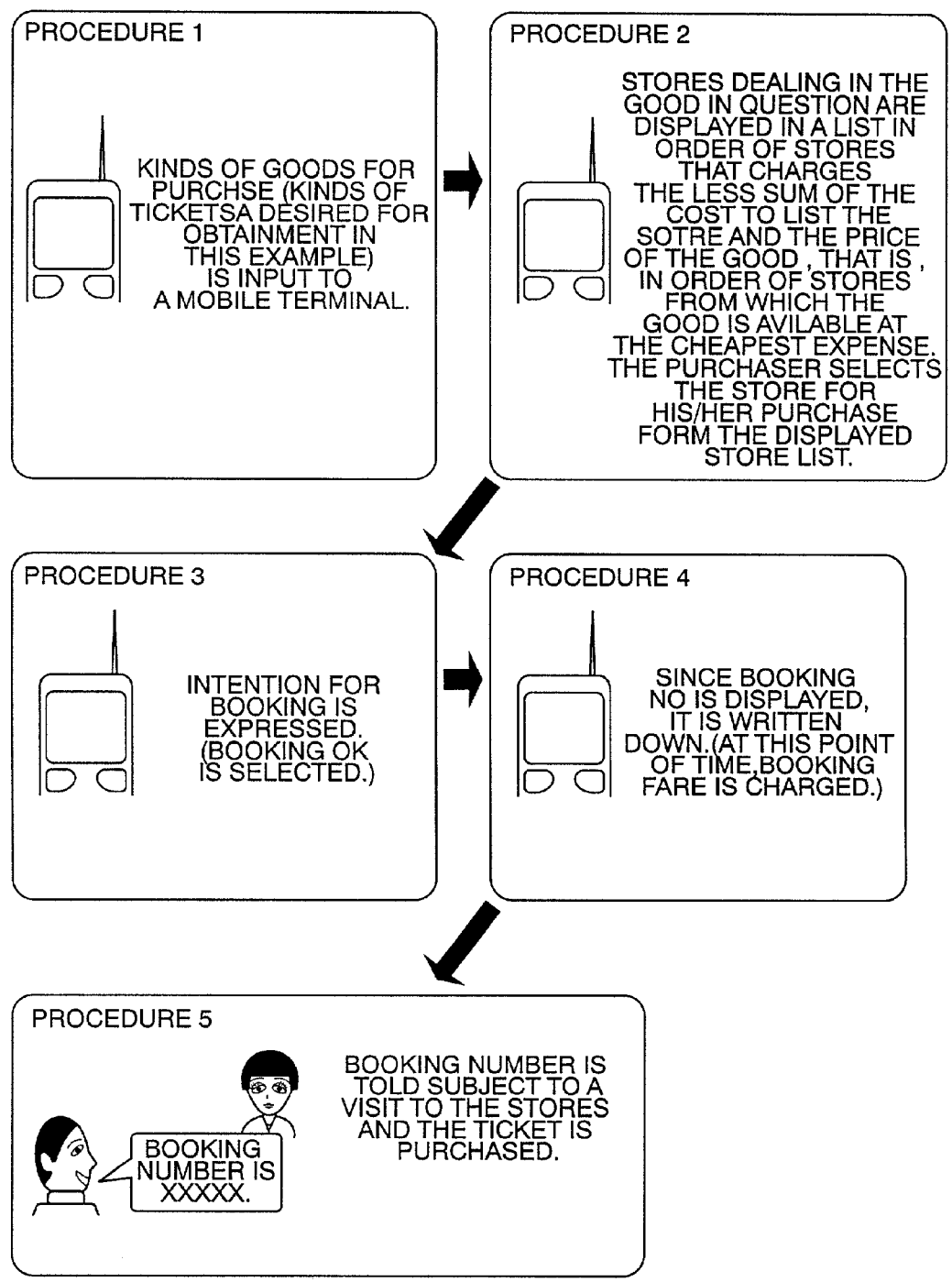
FIG. 1 is a view illustrating a flow to reach a stage where a purchaser selects goods and purchases them in a sales supporting system associated with a navigation system according to a first embodiment of the present invention.
Figure 2:
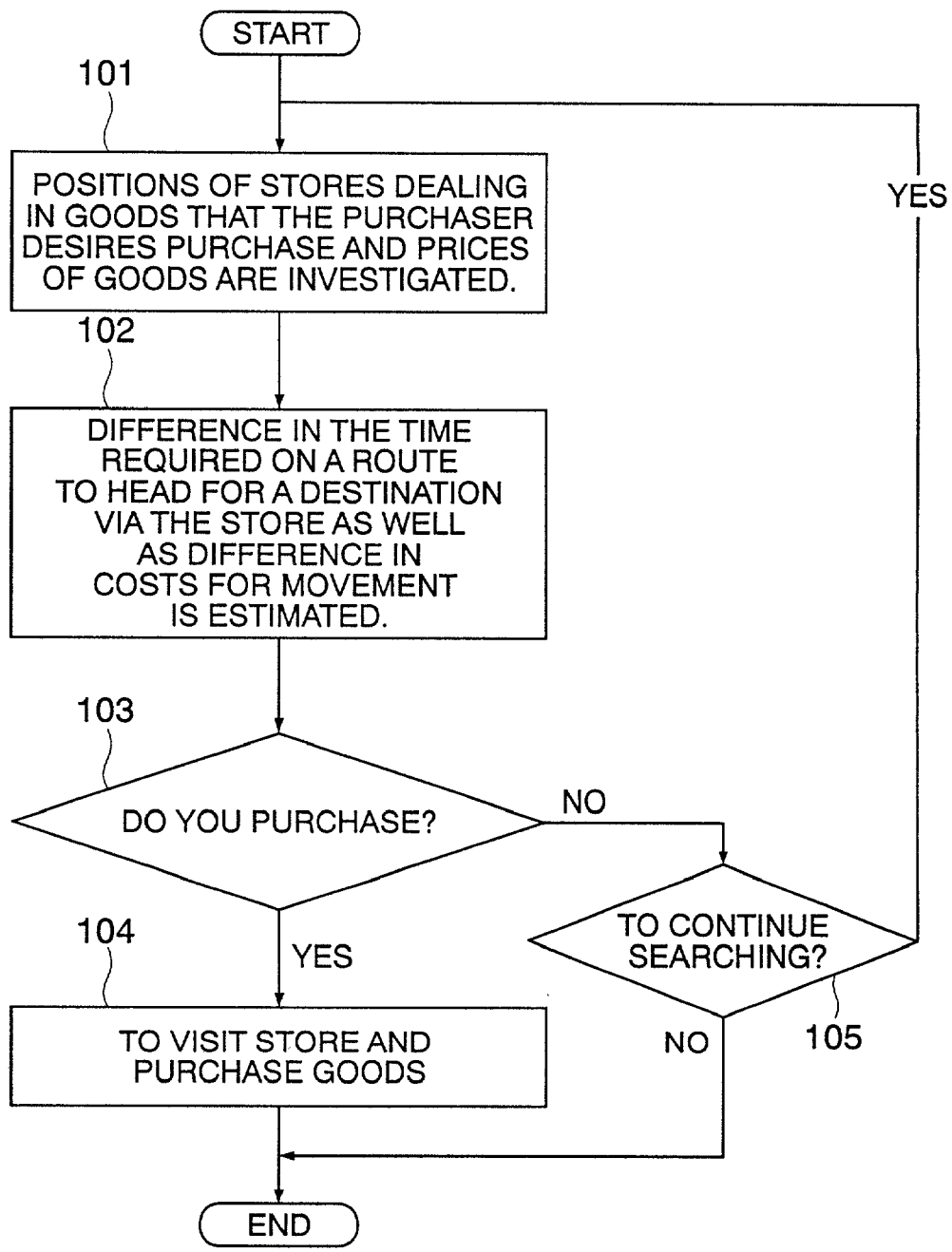
FIG. 2 is a flow chart illustrating an example of a procedure when a purchaser considering stopping by at a store on his/her way to a destination set for another purpose selects a store.

FIG. 1 shows a flow of processing up to when a purchaser selects goods and purchases them in a sales supporting system associated with a navigation system according to a first embodiment of the present invention, and in particular depicts an example in which the system is applied to a bargain ticket sales system.

Figure 3:
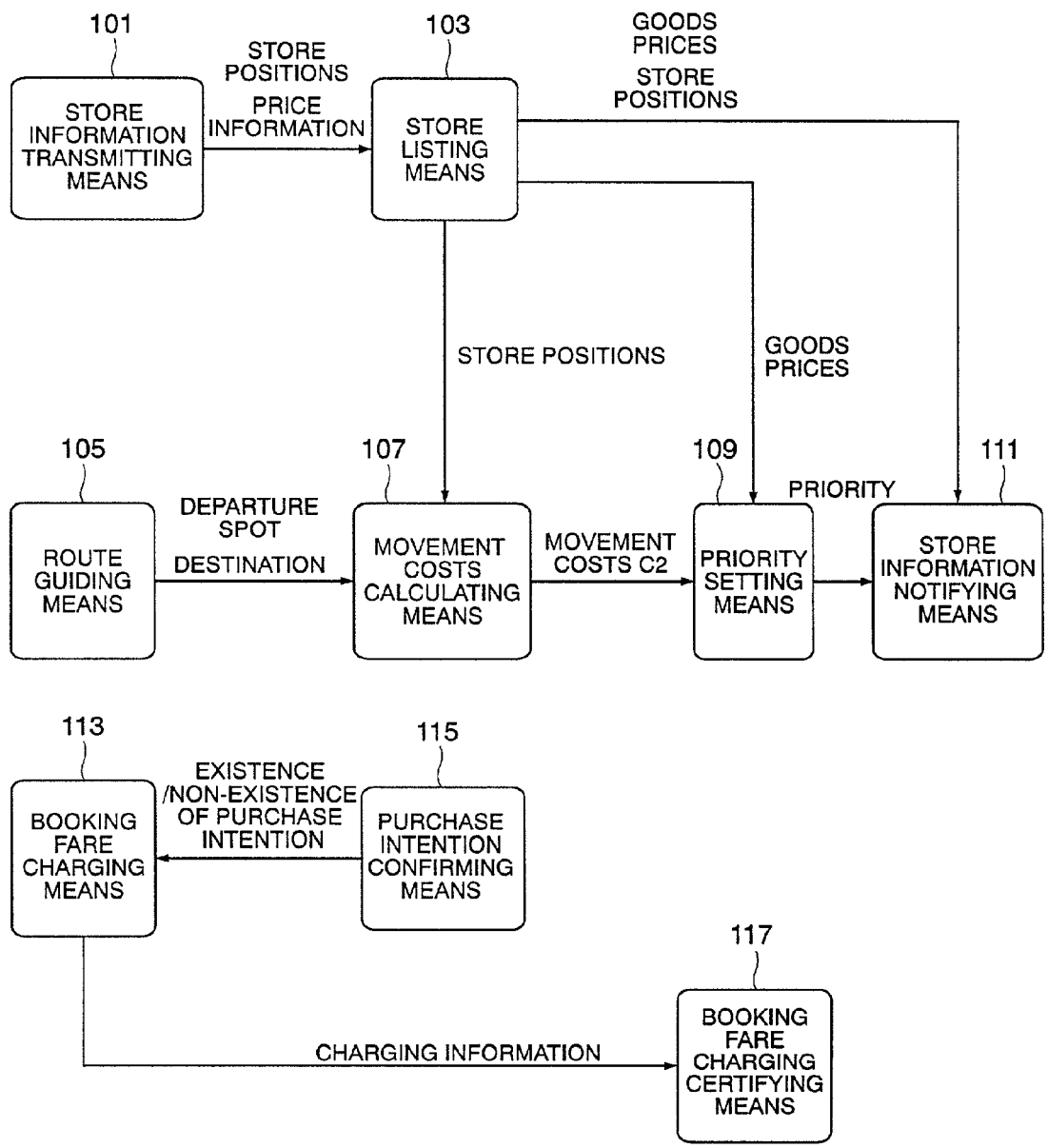
FIG. 3 is a functional block diagram of a system according to the first embodiment of the present invention.

In addition, FIG. 3 shows a functional block diagram of a system according to the present embodiment. In this figure, the system includes a store information transmitting means 101, a store listing means 103, a route guiding means 105, a movement costs calculating means 107, a priority setting means 109, a store information notifying means 111, a booking fare charging means 113, a purchase intention confirming means 115 and a booking fare charging certifying means 117.

Figure 4:
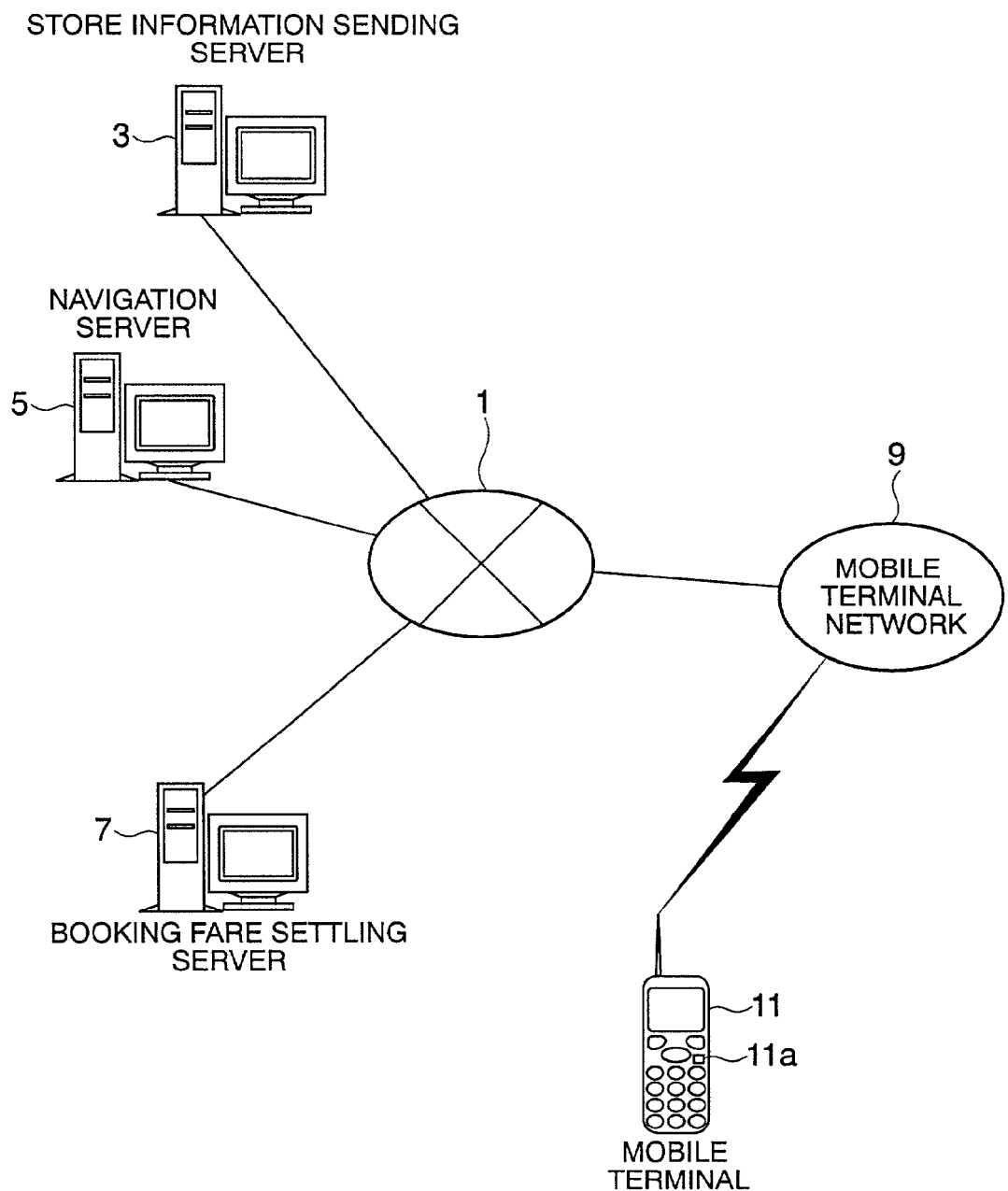
FIG. 4 is a view illustrating an example of a configuration of apparatuses of the system according to the first embodiment of the present invention.

In addition, FIG. 4 depicts an example of a configuration of apparatuses of the system according to the present embodiment. In this figure, a store information sending server 3, a navigation server 5, a booking fare settling server 7, and a mobile terminal network 9 for a mobile terminal 11 that will be at the side of a purchaser, for example, are brought into connection with a network 1.

Next, bringing the functional block diagram in FIG. 3 into focus, the operation of the system will be described.

The store information transmitting means 101 includes the store information sending server 3 and the mobile terminal 11 depicted in the apparatus configuration of FIG. 4. The store information sending server 3 is disposed inside the store or in a server controlling company to which the store has entrusted controlling. A telephone number of the mobile terminal 11 that is owned by the purchaser who has requested for utilization of the above-described system to the store is registered in the store information sending server 3, and when stock availability and prices on bargain tickets have changed, the position of the store as well as the kinds of and the prices for the bargain tickets are transmitted to the mobile terminal 11 of the purchaser via electric mail. In addition, even in the case where a predetermined time has lapsed from the previous transmission, the above-described information is transmitted.

In the above-described case, corresponding to stock availability and prices, the store information is to be transmitted to the purchaser who requested utilization of the above-described system via mail, but the mobile terminal 11 side may be made to have a function to request to the store information sending server 3 transmission of required information so as to be constructed that the store information sending server 3 side transmits the store information required by the mobile terminal 11 in response to a request.

Figure 5:
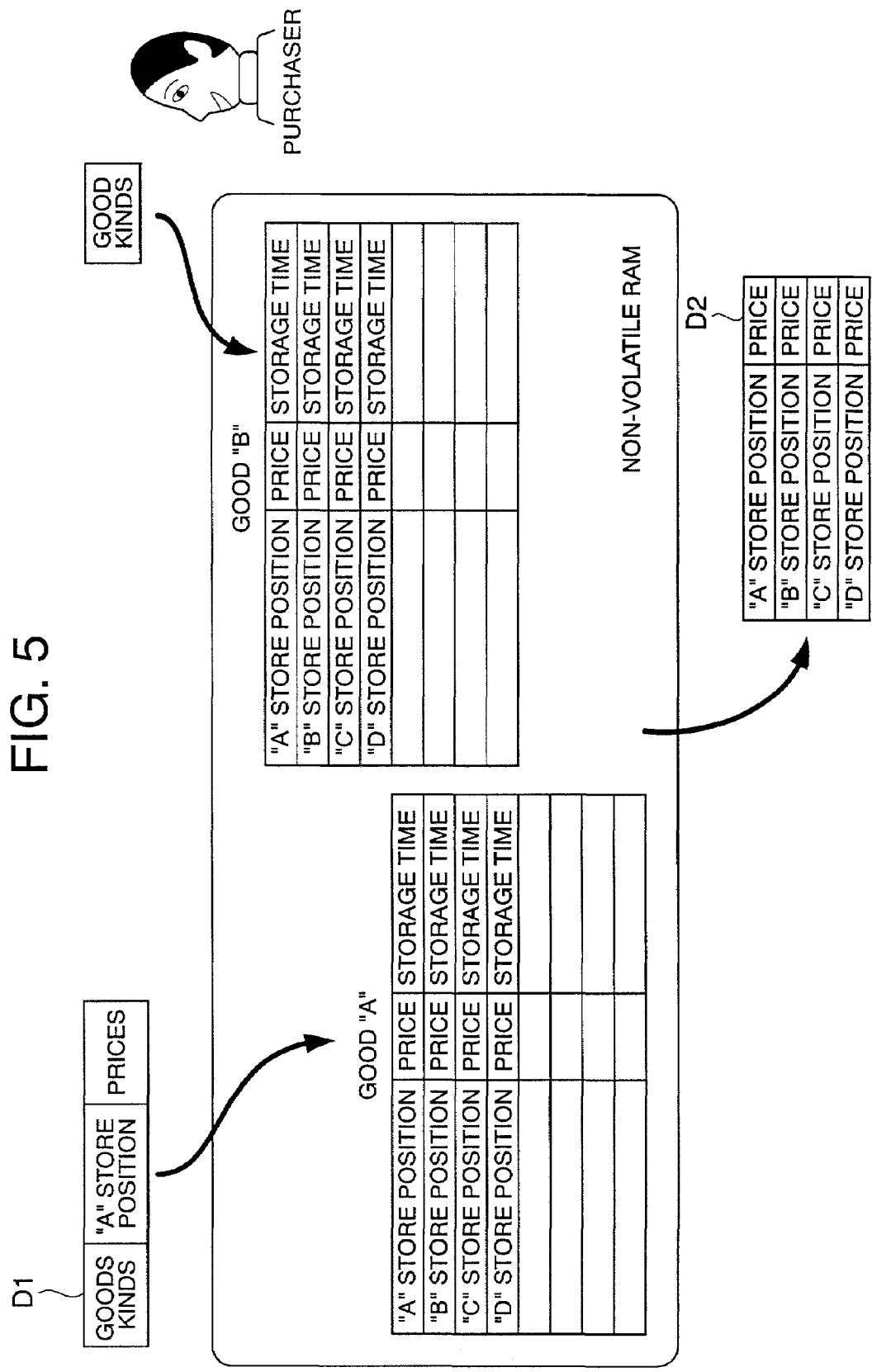
FIG. 5 is a view illustrating the operation of a store listing means in the first embodiment of the present invention.

The store listing means 103 is provided inside the mobile terminal 11 depicted in the apparatus configuration of FIG. 4. Operations will be described with reference to FIG. 5. The mobile terminal 11 comprises a non-volatile RAM 11$a$ that will not lose the stored contents even if the power supply is switched OFF, classifies the store information (the data D1 in FIG. 5) received by the mobile terminal 11 side of the store information transmitting means 101 in terms of titles of goods, and stores it in a storage region provided inside the above-described RAM 11$a$ on title by title basis of respective goods.

In addition, the area to store the time when the store information was stored is also provided in the store information storage region. The area storing the time is always checked, and the store information that has spent a predetermined period or more after the time when it has been stored is deleted, that is, is erased.

In addition, in the case where the storage region corresponding to the good name in the store information newly received is already full, in the store information stored in the storage region, the one with the oldest storage time is deleted so that the above-described store information newly received in the region after deletion is stored. When the purchaser considers purchasing goods (reference should be made to Procedures 1 and 2 of FIG. 1), the store information (the data indicated by D2 in FIG. 5) corresponding to the names of goods inputted by key operations of the mobile terminal 11 and the like is listed and outputted.

The route guiding means 105 includes the navigation server 5 and the mobile terminal 11 shown in the apparatus configuration view in FIG. 4. The mobile terminal 11 and the navigation server 5 are brought into connection via the network 1 and the like with a communication line, and the purchaser connects himself/herself with the navigation server 5 with the mobile terminal 11 so as to set the departure point and the destination with key board operation of the purchaser to get information such as routes and movement costs (transportation fee, etc.). In addition, the departure point and the destination set at that occasion are outputted to the movement costs calculating means 107.

Figure 6:
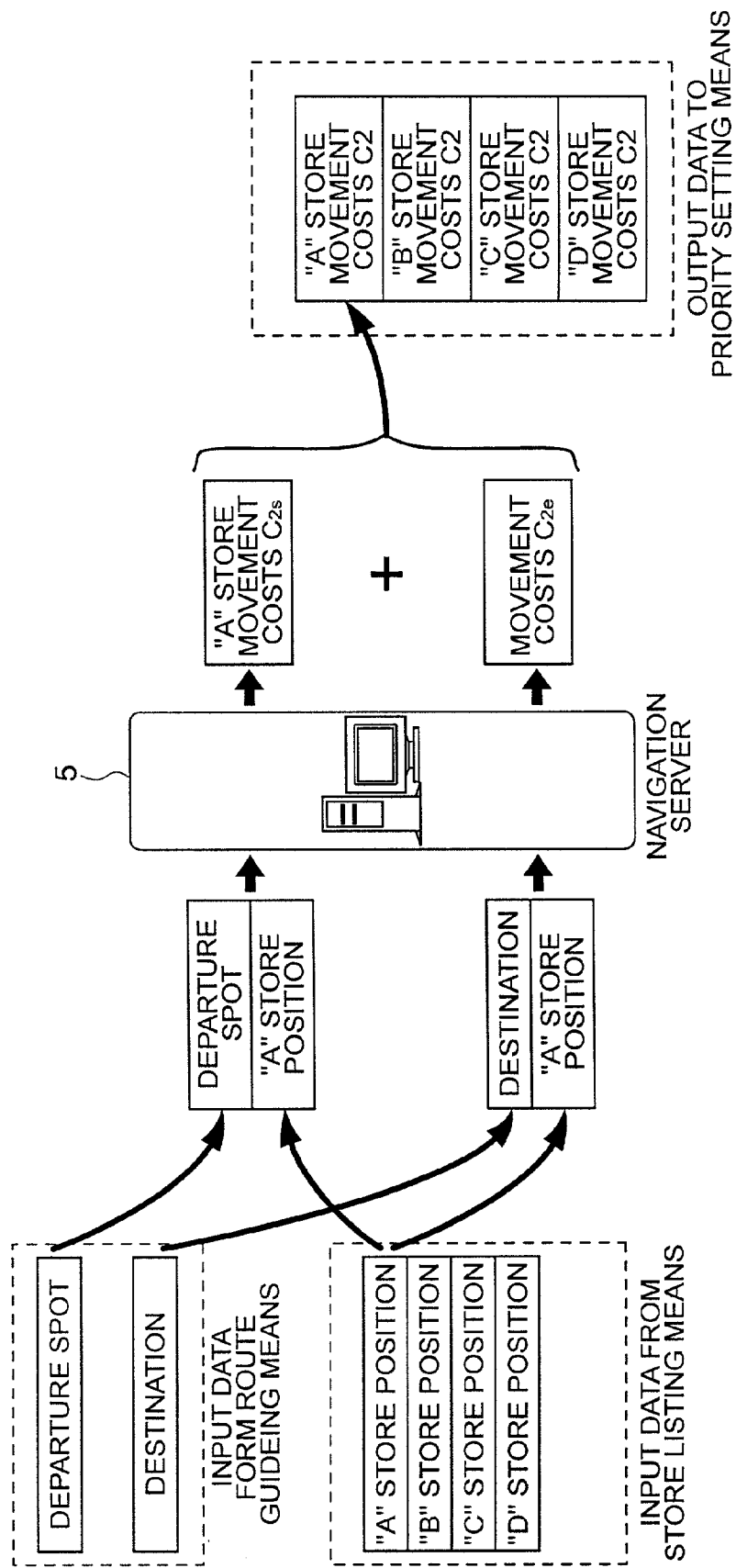
FIG. 6 is a view illustrating the operation of a means for calculating movement costs in the first embodiment of the present invention.

The movement costs calculating means 107 includes the navigation server 5 and the mobile terminal 11 shown in the apparatus configuration of FIG. 4. The mobile terminal 11 and the navigation server 5 are brought into connection with the communication line. The operations will be described with reference to FIG. 6. As shown in FIG. 6, the movement costs calculating means (inside a mobile phone) 107 inquires the navigation server 5 of the movement costs $C_{2s}$ from the departure point set by the route guiding means 105 to respective shops and the movement costs $C_{2e}$ from respective shops to the destination on respective positions of stores outputted from the store listing means 103 to sum the given movement costs $C_{2s}$ and $C_{2e}$ and obtain the movement cost $C_2$ in case of visiting respective shops to be outputted to the priority setting means 109.

Figure 7:
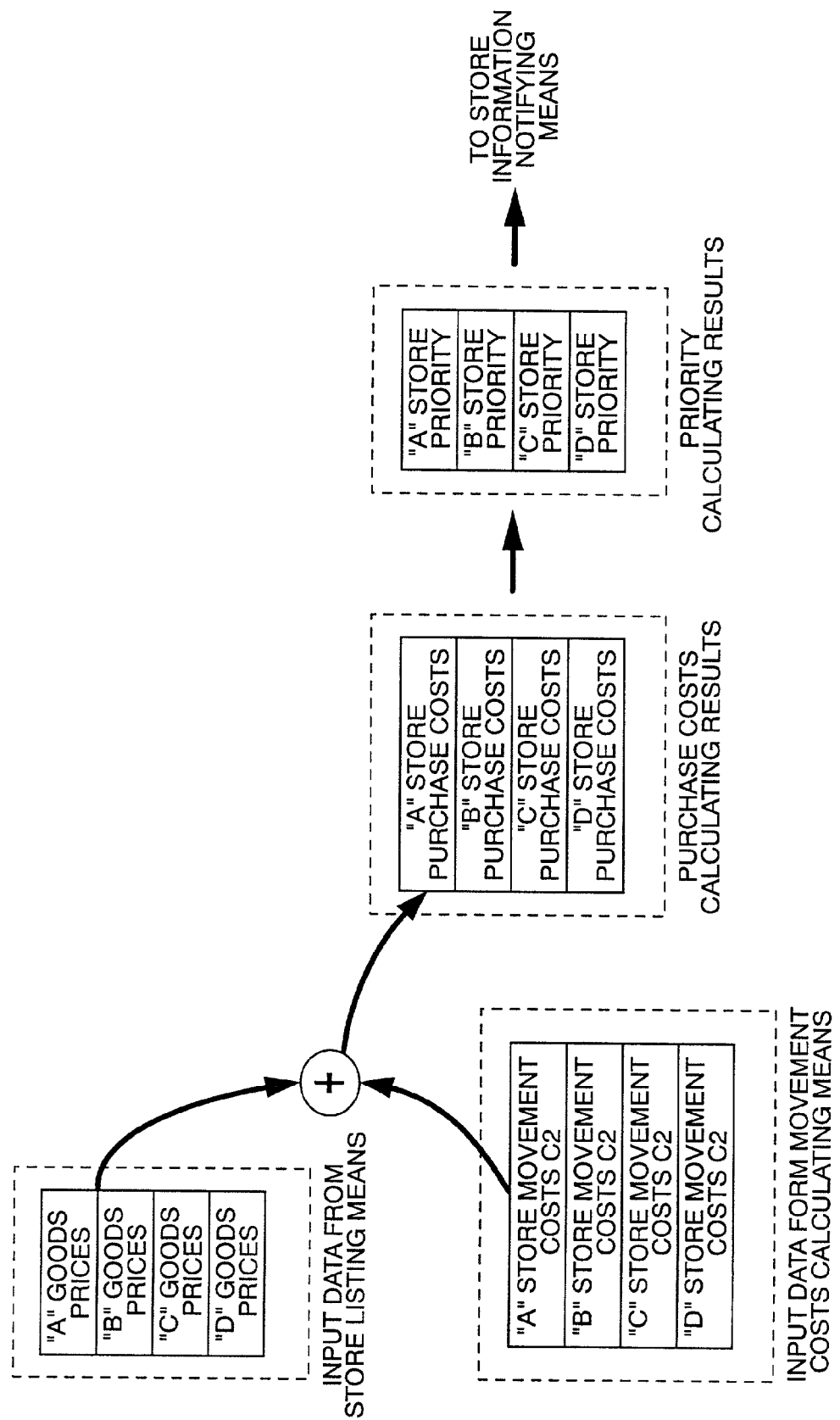
FIG. 7 is a view illustrating the operation of a means for setting priority in the first embodiment of the present invention.

The priority setting means 109 is provided inside the mobile terminal 11 shown in the apparatus configuration of FIG. 4. Operations will be described with reference to FIG. 7. The prices of the goods in respective stores outputted from the store listing means 103 and the movement costs $C_2$ when respective stores outputted form the movement costs calculating means 107 are visited are summed to be treated as the purchase costs, and the one with less purchase costs is given higher priority to be outputted to the store information notifying means 111.

In addition, the purchase costs may be calculated while taking other services into consideration. For the other services, for example, a service that a coupon depending on a purchase amount is issued to a purchaser by a store and the like is well known. For calculating purchase costs on a store where such services are offered, calculations may be executed including subtraction of the amount equivalent to the coupon so that further minute purchase costs can be calculated.

The store information notifying means 111 is provided inside the mobile terminal 11 shown in the apparatus configuration of FIG. 4. Operations will be described as follows. The prices for goods on respective stores and the position of the stores outputted from the store listing means 103 are displayed on a screen of the mobile terminal 11 according to the priority outputted from the priority setting means 109.

The purchase intention confirming means 115 is provided inside the mobile terminal 11 shown in the apparatus configuration of FIG. 4. Operations will be described as follows. Among the stores displayed by the store information notifying means 111, a store where purchase booking is executed is caused to make a purchaser (here, a user of a mobile terminal) select by means of key operations (Procedure 2 in FIG. 1). Next, the selected goods information is displayed to urge the purchaser to reconfirm (Procedure 3 in FIG. 1). If purchase intention is confirmed, the booking fare charging means are notified that there is a purchase intention.

The booking fare charging means 113 includes a mobile terminal 11 and a booking fare settling server 7 shown in an apparatus configuration of FIG. 4. Operations will be described as follows. When the booking fare charging means 113 (inside the mobile terminal) is notified by the purchase intention confirming means 115 that there is a purchase intention, the booking fare settling server 7 is notified of information on the purchase shop as well as the prices for goods. The booking fare settling server 7 charges the booking fare to the purchaser and when charging is normally completed, the booking fare charging certifying means 117 is notified that charging has been normally completed.

The booking fare charging certifying means 117 includes the mobile terminal 11 and the booking fare settling server 7 shown in the apparatus configuration of FIG. 4. Operations will be described as follows. When normal completion of charging is notified by the booking fare charging means 113, a booking number set based on rules having been established in advance is generated to be displayed on the screen of the mobile terminal (Procedure 4 of FIG. 1). The above-described rule having been established in advance is a rule that has been provided so that a third party cannot generate a booking number and is a rule that is provided to judge whether or not the booking number is a normal one based on whether or not the booking number has a hidden regularity by causing a row of numbers to have a hidden regularity. In addition, the same booking number will not be generated again.

In the case where goods are purchased in stores, a purchaser tells the booking number to the store side, and the store side certifies that the booking fare is charged to the purchaser by confirming whether or not the told booking number corresponds to the above-described rule established in advance and whether or not the same booking number has been received (Procedure 5 in FIG. 1).

With the construction described above, purchase of goods is proceeded according to the flow shown in FIG. 1. Now, description will be made according to Procedures 1 to 5 in FIG. 1. In Procedure 1 at first, a purchaser inputs a kind of good for purchase (a kind of ticket he would like to get in case of this embodiment) to a mobile terminal 11 with a keyboard and the like. Next, in Procedure 2, stores dealing in the goods in question are displayed in a list on the display screen of the mobile terminal 11 in order of stores that charges the less sum of the cost to visit the store and the prices of the goods, that is, in order of stores from which the goods are available at the cheapest expense. The purchaser selects the store for his/her purchase from the displayed store list with a keyboard and the like.

In Procedure 3, the purchaser expresses his/her intention for booking with a keyboard and the like. If he/she purchases, booking OK is selected. In Procedure 4, since the booking number is displayed on the display screen of the mobile terminal 11, the purchaser makes a note of this. In addition, at this point of time, the booking fare is charged. In addition, in Procedure 5, the purchaser visits the store and tells his booking number so that he/she can purchase the ticket.

Embodiments 2

Figure 8:
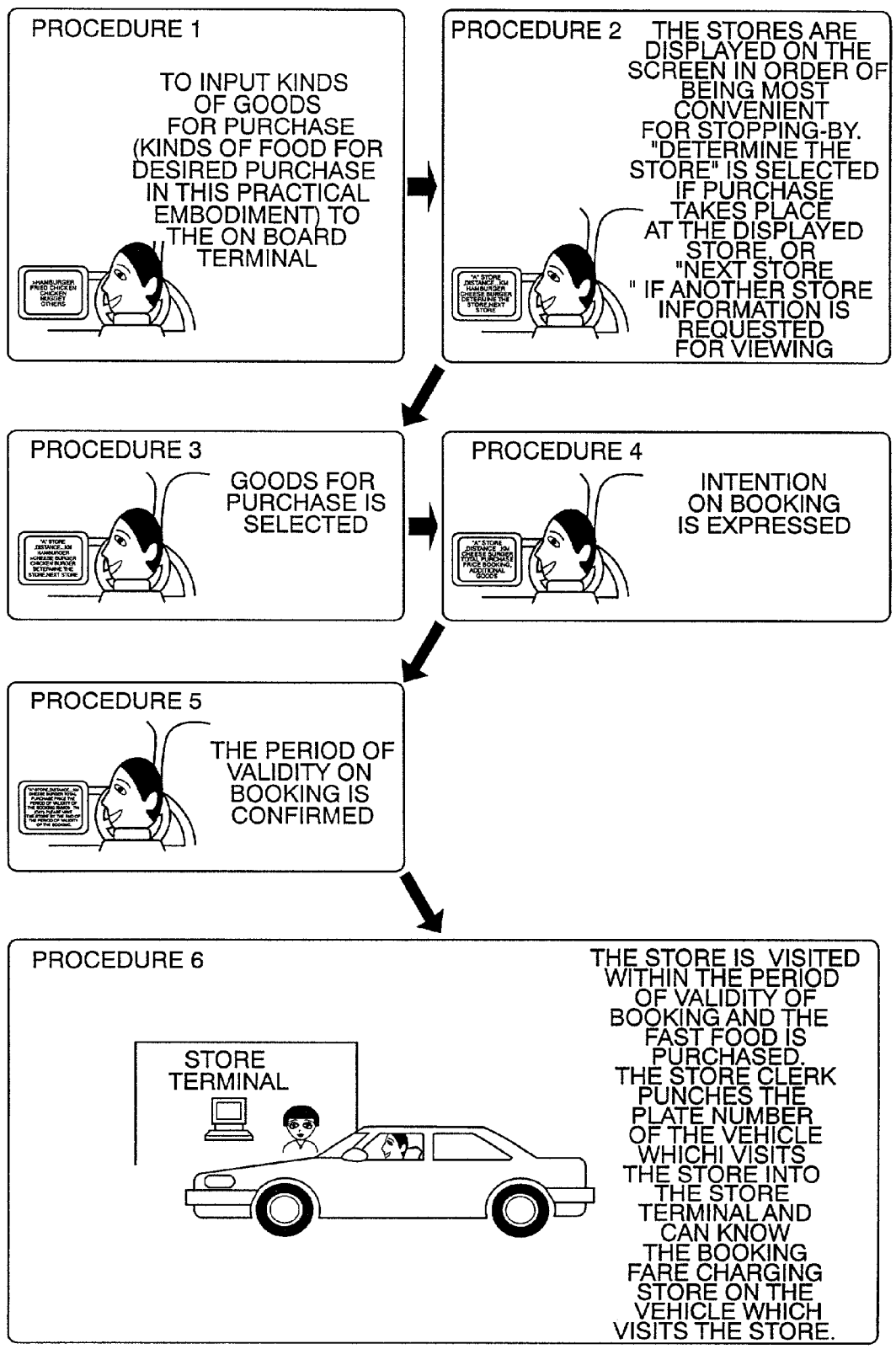
FIG. 8 is a view illustrating a flow to reach a stage where a purchaser selects goods and purchases them in a sales supporting system associated with a navigation system according to a second embodiment of the present invention.

FIG. 8 shows a flow of processing up to when a purchaser selects a good and purchases it in a sales supporting system associated with the navigation system according to a second embodiment of the present invention, and in particular depicts an example in which the system has been applied to a drive through booking sales system.

Figure 9:
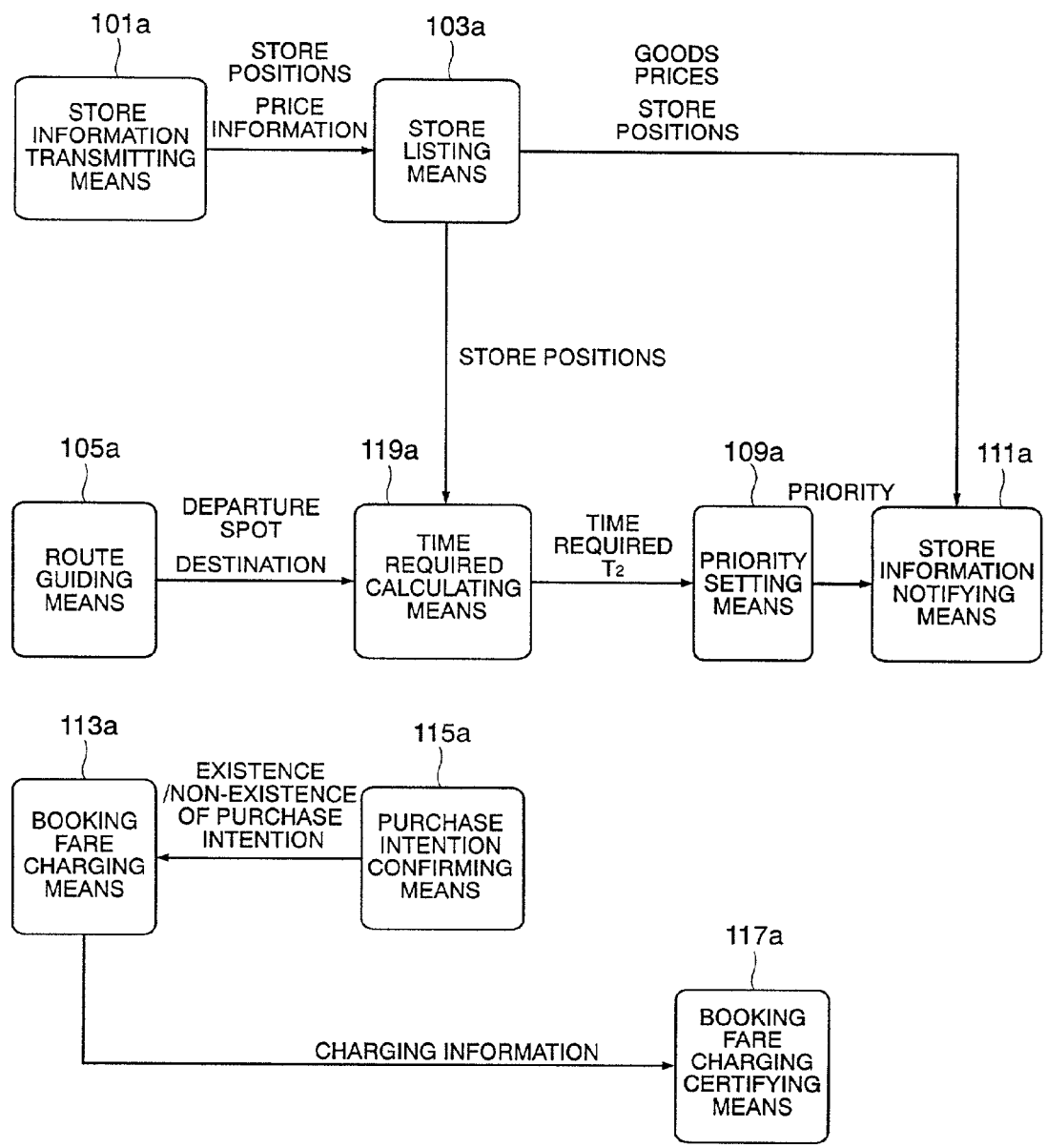
FIG. 9 is a functional block diagram of a system according to the second embodiment of the present invention.

In addition, FIG. 9 shows a functional block diagram of a system according to the second embodiment. In this figure, the system of this second embodiment includes a store information transmitting means 101a, a store listing means 103a, a route guiding means 105a, a priority setting means 109a, a store information notifying means 111a, a booking fare charging means 113a, a purchase intention confirming means 115a, a booking fare charging certifying means 117a, and a required-time calculating means 119a.

Figure 10:
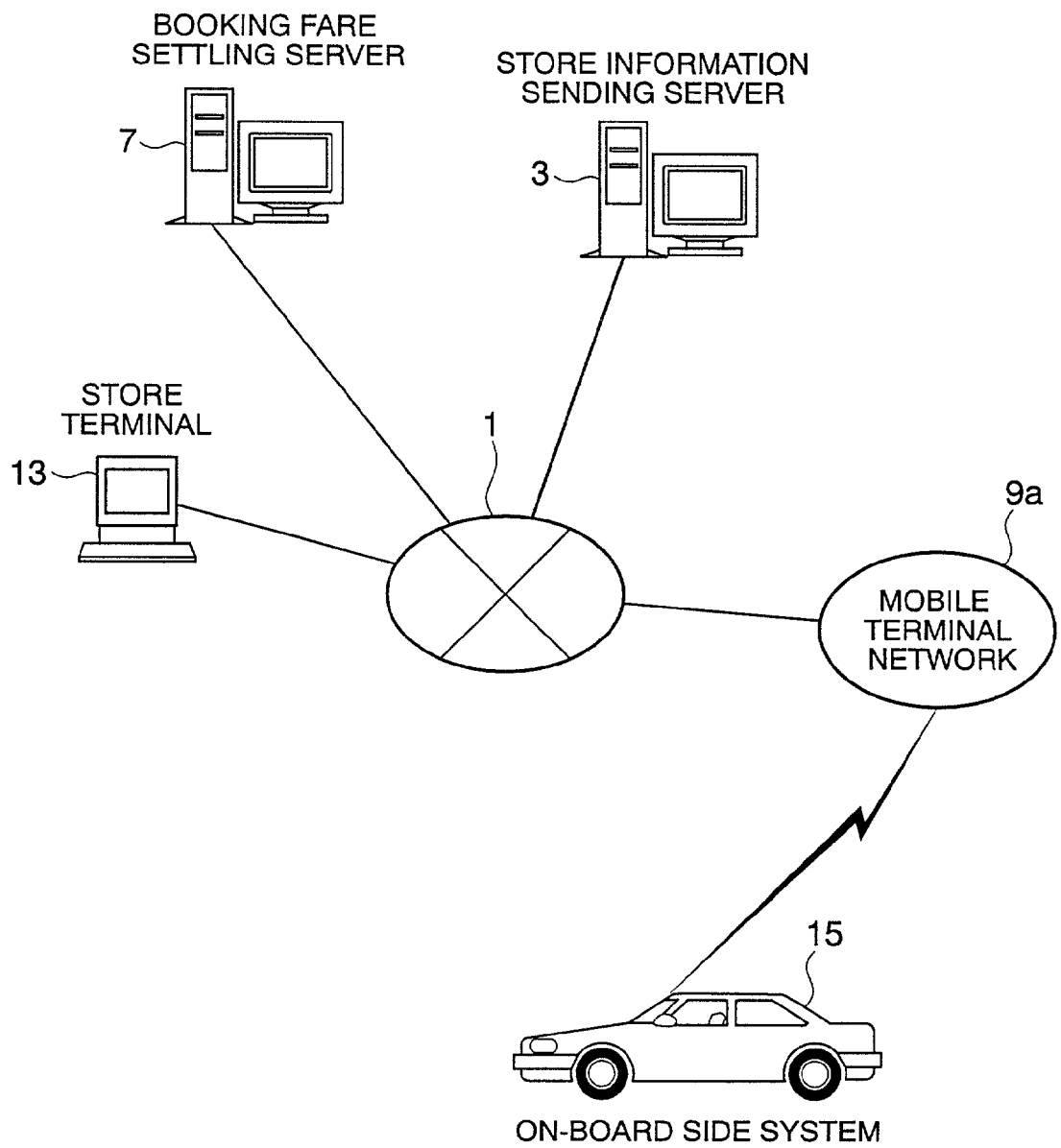
FIG. 10 is a view illustrating an example of a configuration of apparatuses of the system according to the second embodiment of the present invention.

In addition, FIG. 10 depicts an example of a configuration of apparatuses of the system according to the second embodiment of the present invention. In this figure, the same or equivalent parts as or to those of the above-described first embodiment are denoted by the same symbols. The system of the second embodiment includes a mobile terminal network 9a, a store terminal 13, and an on-board side system 15 in the form of a mobile terminal which replaces a mobile terminal 11 of a purchaser.

Next, bringing the functional block diagram in FIG. 9 into focus, the operation of the system according to the second embodiment will be described.

The store information transmitting means 101a includes the store information sending server 3 and the on-board side system 15 as depicted in the apparatus configuration of FIG. 10. The store information sending server 3 is disposed in a server control company to which the store has entrusted controlling. The store information sending server 3 and the on-board side system 15 are connected with a data communication line via a network 1 such as the Internet, etc., as well as the mobile terminal network 9*a* such as a mobile telephone network, etc. The store information transmitting means 101*a* transmits store positions and price information to the store listing means 103*a* in response to requests of the store listing means 103*a*.

Figure 11:
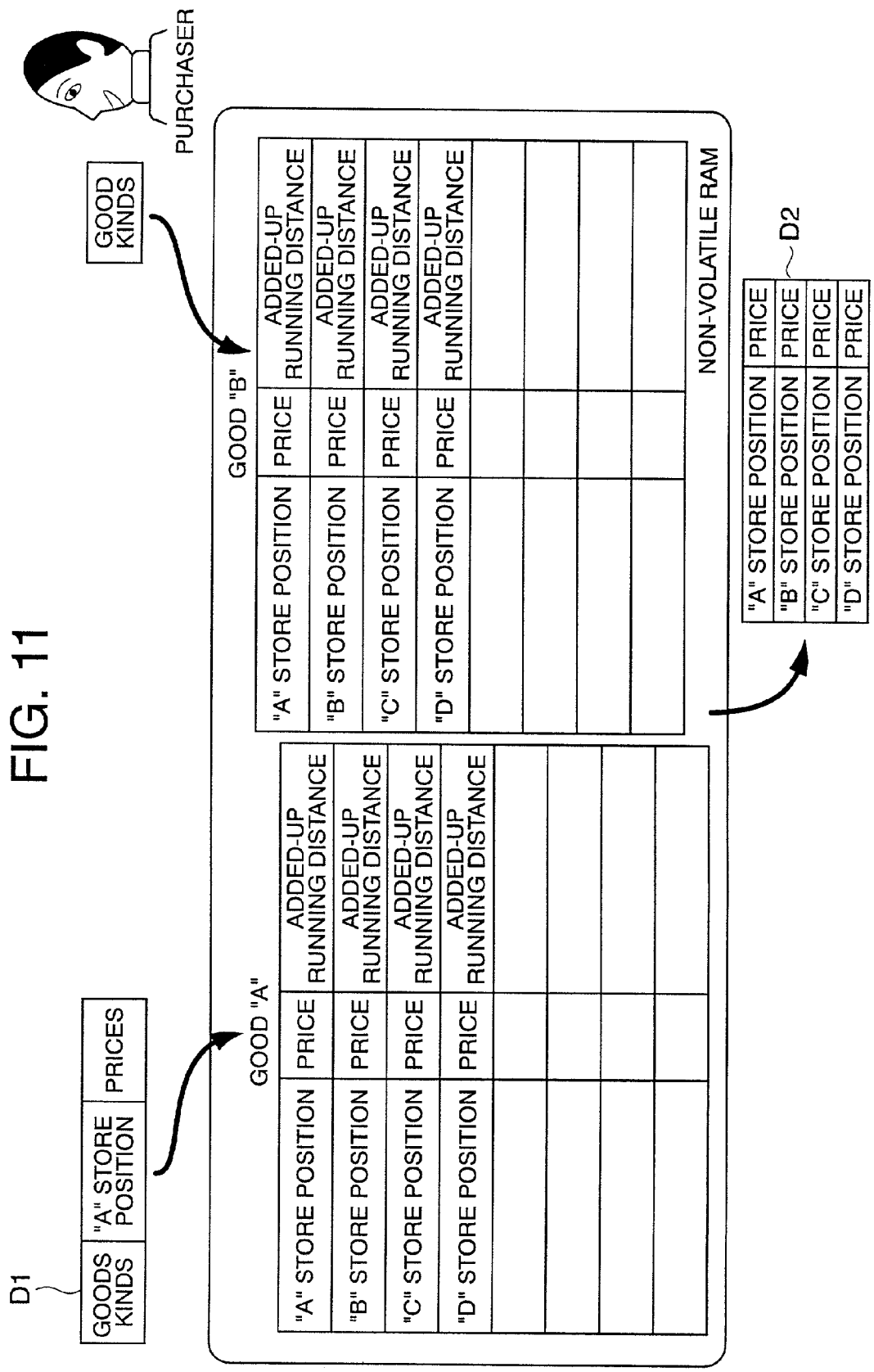
FIG. 11 is a view illustrating the operation of a store listing means in the second embodiment of the present invention.

The store listing means 103*a* is provided inside the on-board side system 15 as depicted in the apparatus configuration of FIG. 10. Operations will be described with reference to FIG. 11. The on-board side system 15 requests transmission of information to the store information transmitting means 101*a* every time when the vehicle mounting the system on-board runs a constant distance when the purchaser selects goods, classifies the store information (the data D1 in FIG. 11) received by the store information transmitting means 101*a* in terms of titles of goods, and stores it in a storage region on a title-by-title basis of respective goods. In addition, the area to store the added-up running distance of the on-board vehicle when the store information was stored is also provided in the store information storage region. The area for the above-described added-up distance of the storage area is always checked, and the corresponding store information is deleted from storage area when the on-board vehicle runs a predetermined distance or more after the time when it has been stored.

In addition, in the case where the storage region corresponding to the titles of goods in the store information newly received is already full, in the store information stored in the storage region, the one with the largest stored added-up distance is deleted so that the above-described store information newly received in the region after deletion is stored. When the purchaser considers purchasing goods (reference should be made to Procedures 1 to 3 of FIG. 8), the store information (the data indicated by D2 in FIG. 11) corresponding to the name of goods inputted by key operations of the on-board side system (on-board terminal) 15 and the like is listed and outputted.

The route guiding means 105*a* is provided inside the on-board side system 15 shown in the apparatus configuration of FIG. 10. The construction of the route guiding means 105*a* is shown in FIG. 20. When the purchaser has set a destination in the on-board side system with a destination setting means 1053, a route guiding control means 1055 calculates the route from the current position identified by a position identifying means 1052 to the above-described set destination with a map database, proceeds with route guidance to the purchaser with a guidance display means 1054 and outputs to the required-time calculating means 119*a*, taking the current position and the destination respectively as the departure point and the destination. Incidentally, a map database 1051 is also used as a database when the time required is calculated by the required-time calculating means 119*a* to be described below and when the movement costs are calculated with the movement costs calculating means 107 and 107*a*.

Figure 12:
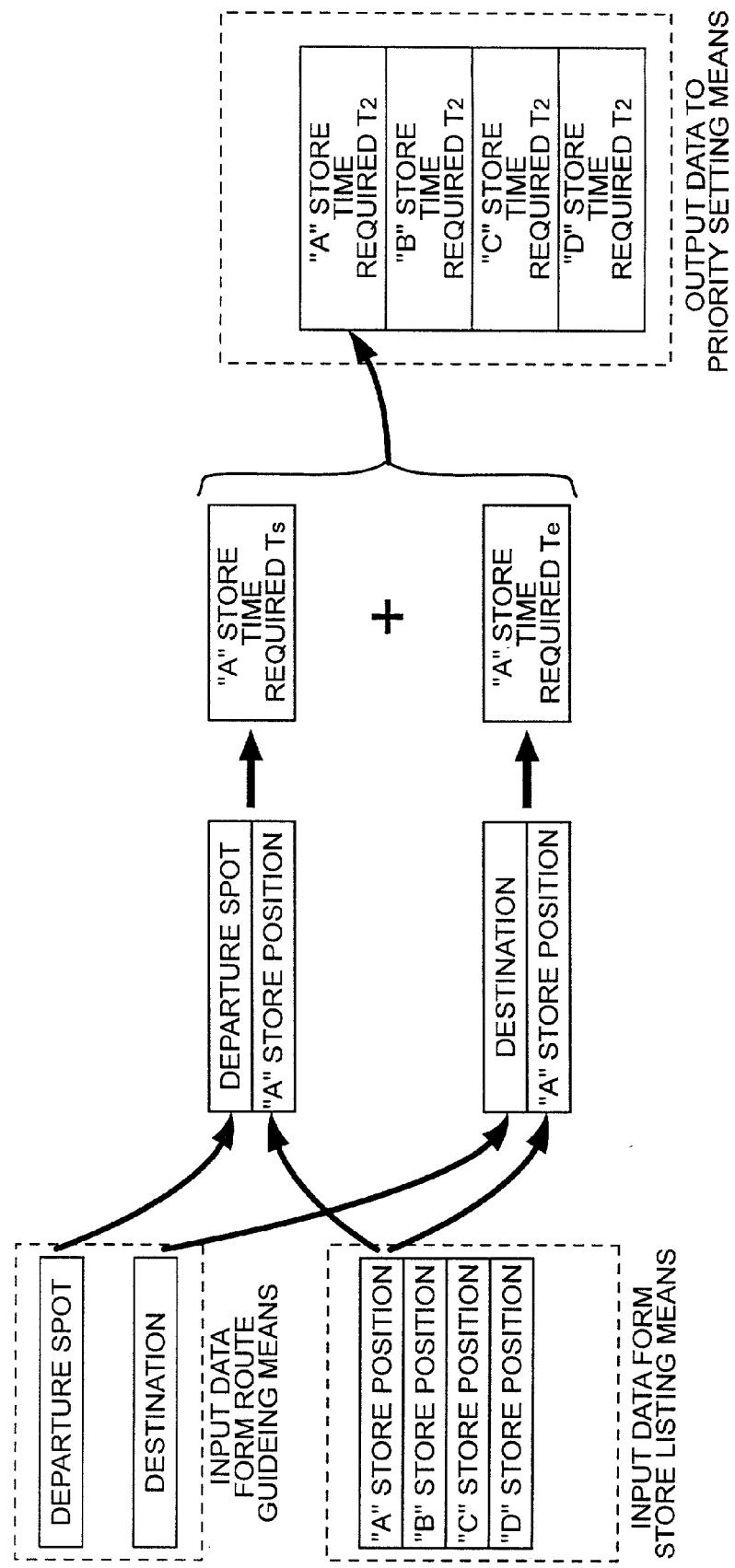
FIG. 12 is a view illustrating the operation of a means for calculating a time required in the second embodiment of the present invention.

The required-time calculating means 119*a* is provided inside the on-board side system 15 depicted in the apparatus configuration of FIG. 10. Operations will be described with reference to FIG. 12. As shown in FIG. 12, the required-time calculating means 119*a* calculates the required time $T_s$ from the departure point set by the route guiding means 105*a* to respective shops and the time required $T_e$ from respective shops to the destination on respective positions of stores outputted from the store listing means 103*a* to sum the given times required $T_s$ and $T_e$, and obtains the required time $T_2$ in case of visiting respective shops to be outputted to the priority setting means 109*a*. Each time required is calculated with the map database 1051 that is also used in the route guiding means 105*a*.

The priority setting means 109*a* is provided inside the on-board side system 15 shown in the apparatus configuration of FIG. 10. Operations will be described as follows. The one with less required time $T_2$ outputted by the required-time calculating means 119*a* is given higher priority to be outputted to the store information notifying means 111*a* in order.

The store information notifying means 111*a* is provided inside the on-board side system 15 shown in the apparatus configuration of FIG. 10. Operations will be described as follows. The prices for goods on respective stores and the positions of the stores outputted from the store listing means 103*a* are displayed on a screen of the on-board side system 15 according to the priority outputted from the priority setting means 109*a*.

The purchase intention confirming means 115*a* is provided inside the on-board side system 15 shown in the apparatus configuration of FIG. 10. Operations will be described as follows. Among the stores displayed by the store information notifying means 111*a*, a purchaser is made to select a store where purchase booking is executed and goods for purchase by means of key operations (Procedures 2 and 3 in FIG. 8). Next, the selected goods information is displayed to urge the purchaser to reconfirm (Procedure 4 in FIG. 8). If purchase intention is confirmed, the booking fare charging means 113*a* are notified of the fact that there is a purchase intention. In addition, in that occasion, the plate number or registration number of the vehicle in which the on-board side system 15 is mounted is notified.

The booking fare charging means 113*a* includes the on-board side system 15 and the booking fare settling server 7 shown in an apparatus configuration of FIG. 10. Operations will be described as follows. When the on-board side system 15 of the booking fare charging means 113*a* is notified by the purchase intention confirming means 115*a* the fact that there is a purchase intention, the booking fare settling server 7 side of the booking fare charging means 113*a* is notified of information on the purchase shop as well as the prices for goods. The booking fare settling server 7 charges the booking fare to the purchaser upon receipt of notice and sets a period of validity for the booking. When charging is normally completed, the booking fare charging certifying means 117*a* and the on-board system 15 side of the booking fare charging means 113*a* is notified that charging has been normally completed. In the on-board system 15 side, the contents of the booking and the period of validity is displayed on a screen of the on-board side system 15 so that the purchaser confirms the contents of the booking (Procedure 5 in FIG. 8). In addition, to the booking fare charging certifying means 117*a*, the vehicle registration number notified by the purchase intention confirming means 115*a* is also notified.

The booking fare charging certifying means 117*a* includes the store terminal 13 and the booking fare settling server 7 shown in the apparatus configuration of FIG. 10. Operations will be described as follows. When it is notified that the charging has been normally completed by the booking fare charging means 113*a*, the contents of the booked goods, the period of validity of the booking and the vehicle registration number are stored. When the goods are purchased at the store, a store clerk of the store inputs the vehicle registration number to the store terminal 13. The store terminal 13 inquires the booking fare settling server 7 of the existence and contents of the booking corresponding to the inputted vehicle registration number via the network 1. The booking fare settling server 7 confirms the corresponding booking existence or contents thereof with the storage data in response to the inquiry. If there exist the corresponding storage data, the booking contents are notified to the store terminal 13 and the corresponding booking is deleted from the storage.

With the construction described above, purchase of goods is proceeded according to the flow shown in FIG. 8. Now, description will be made according to Procedures 1 to 6 in FIG. 8. In Procedure 1 at first, a purchaser riding in a vehicle inputs kinds of goods for purchase (a kind of food he or she would like to get in case of this embodiment) to a mobile terminal (not shown in particular) of an on-board side system 15 with a keyboard and the like.

<Display on a display screen of the on-board side system 15 in Procedure 1>
>hamburger
fried chicken
chicken nugget
others Then, in Procedure 2, on the display screen of the on-board side system 15, the stores are displayed in order of being most convenient for stopping-by. The purchaser selects "determine the store" if he/she purchases at the displayed store, or selects "next store" if he/she would like to see another store information.

<Display on a display screen of the on-board side system 15 in Procedure 2>

| A store | distance . . . Km |
|---|---|
| hamburger | |
| cheese burger | |
| chicken burger | |
| determine the store | next store |

If the store is determined, the purchaser selects goods for purchase in Procedure 3.

<Display on a display screen of the on-board side system 15 in Procedure 3>

| A store | distance . . . Km |
|---|---|
| hamburger | |
| >cheese burger | |
| chicken burger | |
| determine the store | next store |

If selection on goods has been finalized, the purchaser expresses his/her intention on booking in Procedure 4.

<Display on a display screen of the on-board side system 15 in Procedure 4>

| A store | distance . . . Km |
|---|---|
| cheese burger | |
| total purchase price ¥ . . . | |
| booking | additional goods |

Moreover, in Procedure 5, the purchaser confirms the period of validity of the booking.

<Display on a display screen of the on-board side system 15 in Procedure 5>

| A store | distance . . . Km |
|---|---|
| cheese burger | |
| total purchase price ¥ . . . | |

The period of validity of the booking is (month) (day). Please visit the store by the end of the period of validity of the booking.

In addition, in Procedure 6, the purchaser visits the store within the period of validity of booking and can purchase the fast food. The store clerk punches the plate number or registration number of the vehicle which visits the store into the store terminal 13 and can know the booking fare charging state on the vehicle which visits the store.

Embodiment 3

Figure 13:
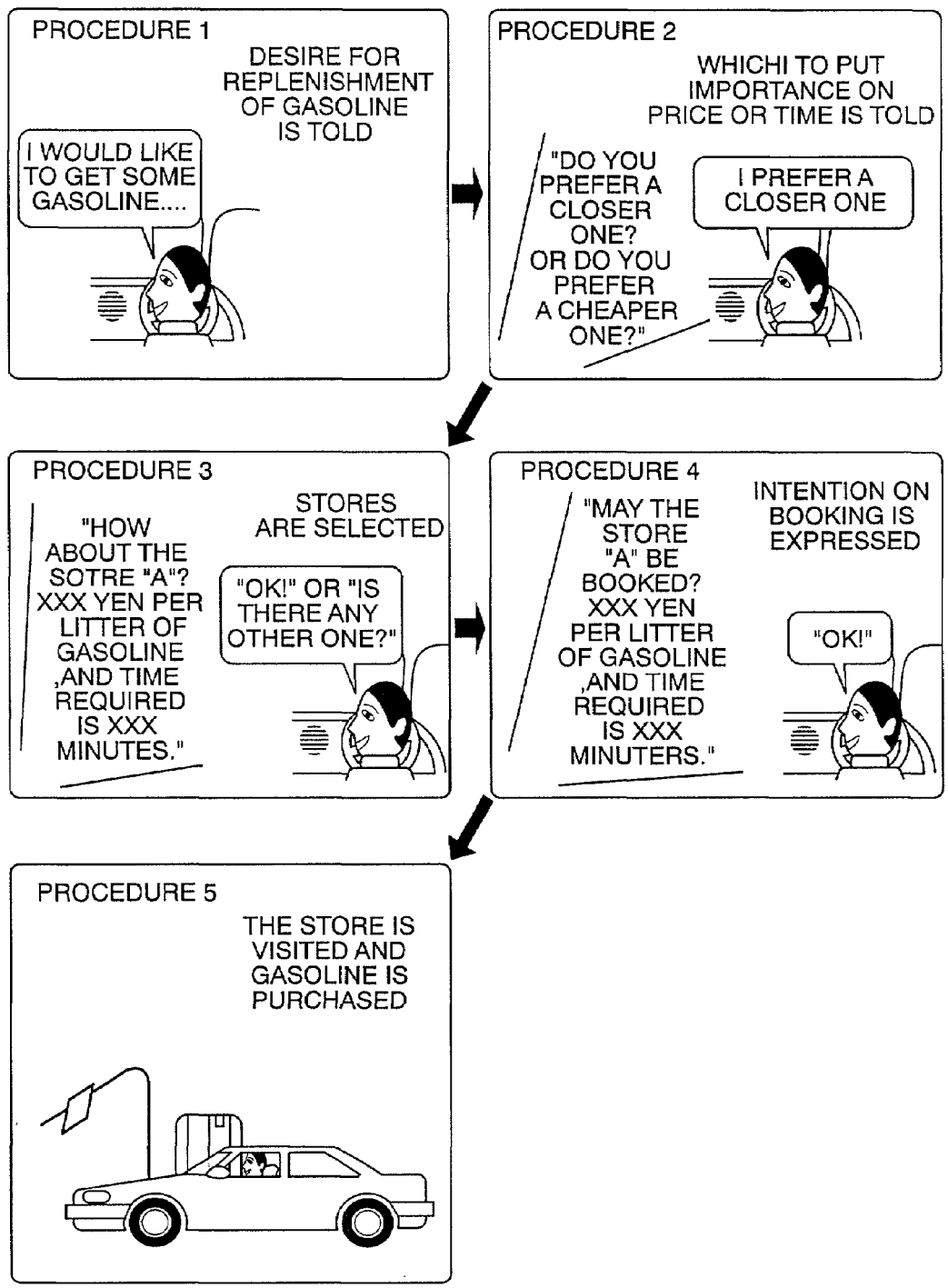
FIG. 13 is a view illustrating a flow to reach a stage where a purchaser selects goods and purchases them in a sales supporting system associated with a navigation system according to a third embodiment of the present invention.

FIG. 13 shows a flow of processing up to when a purchaser selects a good and purchases it in a sales supporting system in cooperation with the navigation system according to a third embodiment of the present invention, and in particular depicts an example in which the system is applied to an automobile fuel booking sales system.

Figure 14:
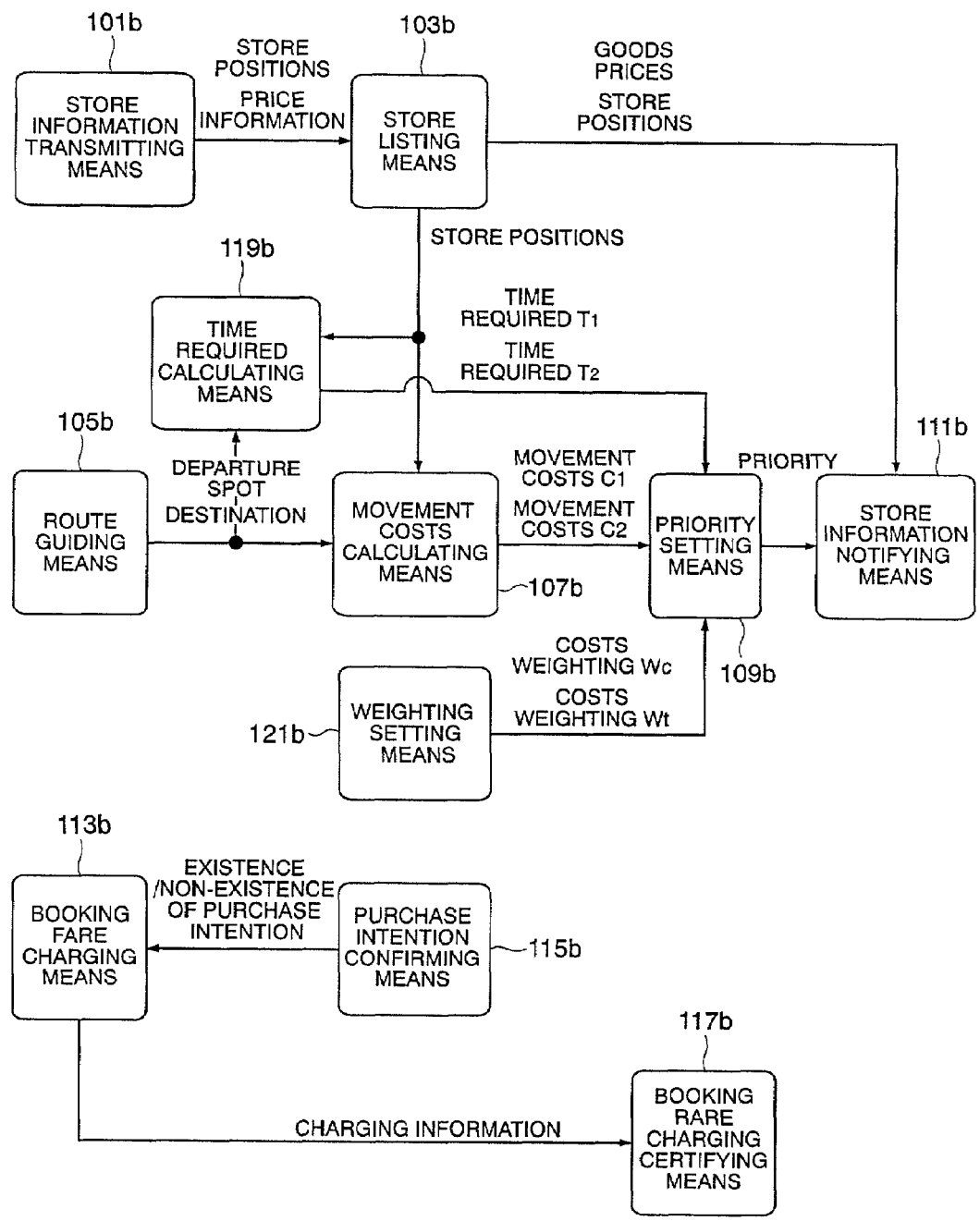
FIG. 14 is a functional block diagram of a system according to the third embodiment of the present invention.

In addition, FIG. 14 shows a functional block diagram of the system according to the present embodiment. In this figure, the system of this third embodiment includes a store information transmitting means 101b, a store listing means 103b, a route guiding means 105b, a movement costs calculating means 107b, a priority setting means 109b, a store information notifying means 111b, a booking fare charging means 113b, a purchase intention confirming means 115b, a booking fare charging certifying means 117b, a required-time calculating means 119b and a weighting setting means 121b.

Figure 15:
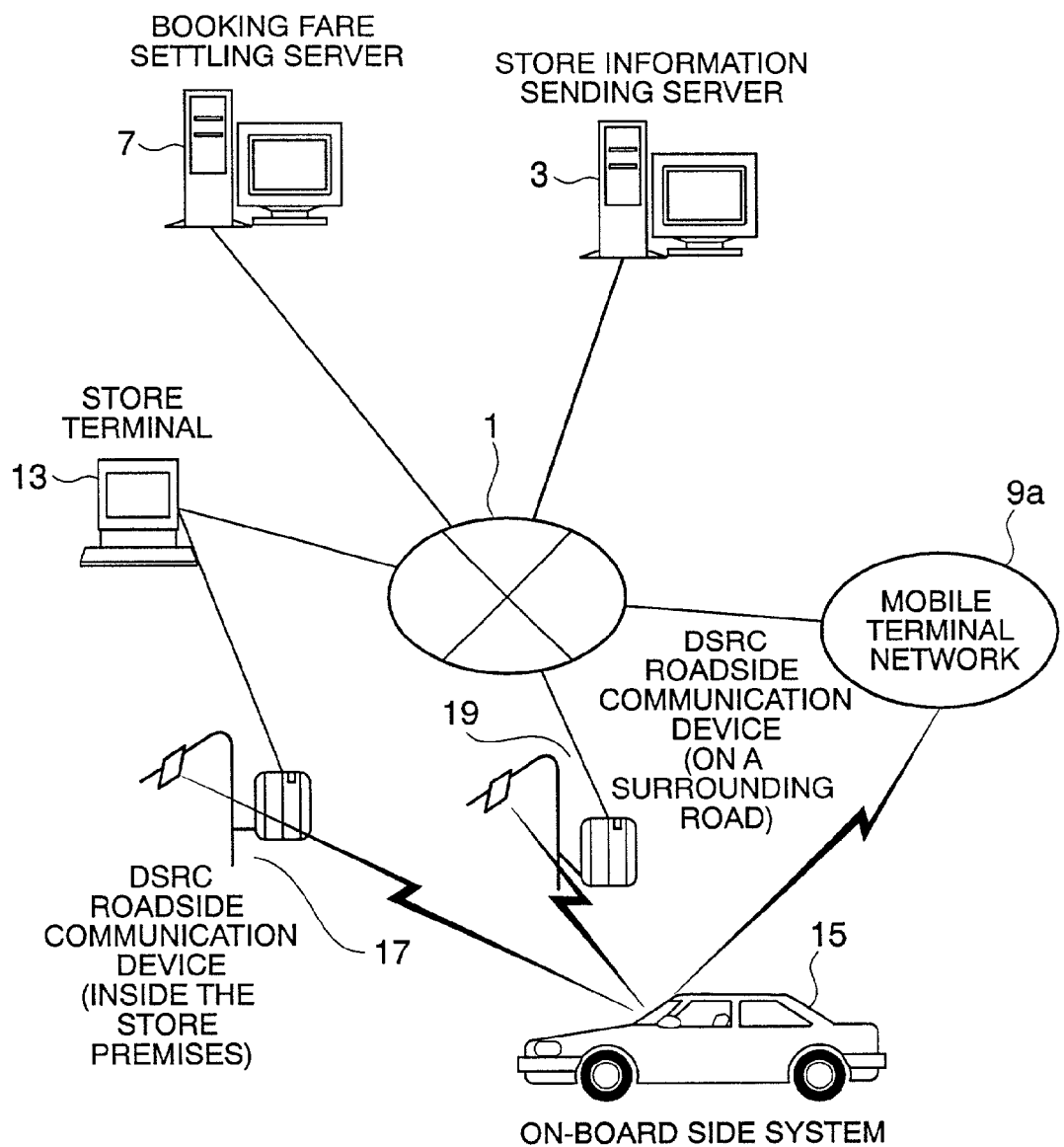
FIG. 15 is a view illustrating an example of a configuration of apparatuses of the system according to the third embodiment of the present invention.

In addition, FIG. 15 depicts an example of a configuration of apparatuses of the system according to the third embodiment of the present invention. In this figure, the same or equivalent parts as or to those of the above-described embodiments are denoted by the same symbols. The system of the third embodiment includes DSRC roadside communication devices 17 and 19 provided within the store premises and on the surrounding roads, respectively, and each including a communication apparatus for communicating with an on-board side system 15.

Next, bringing the functional block diagram in FIG. 14 into focus, the operation of the system according to the third embodiment will be described.

The store information transmitting means 101b includes the on-board side system 15, the store information sending server 3 and the DSRC roadside communication devices 19 on the surrounding roads depicted in the apparatus configuration of FIG. 15. Respective parties are connected with a data communication line via a network 1 such as the Internet, etc., as well as the mobile terminal network 9a such as a mobile telephone network, etc. The store information sending server 3 transmits price information corresponding to the positions of the DSRC roadside communication devices 19 on the surrounding roads to the DSRC roadside communication devices 19 on the surround roads. The DSRC roadside communication devices 19 on the surrounding roads transmit store positions and price information to the on-board side system 15 and transmits the period of validity of information to the store listing means 103b when the vehicle of a purchaser passes through a communication area of the communication apparatus. At this occasion, with an appropriate value being taken for the period of validity for transmission, setting can be made so that the period of validity on information is expired before the system-mounted vehicle departs the DSRC roadside communication devices 19 on the surrounding roads. With the above-described construction, store information only valid to the system-mounted vehicles existing in a specific spot will be able to be provided, and setting prices depending on the position of the purchaser will become possible.

Figure 16:
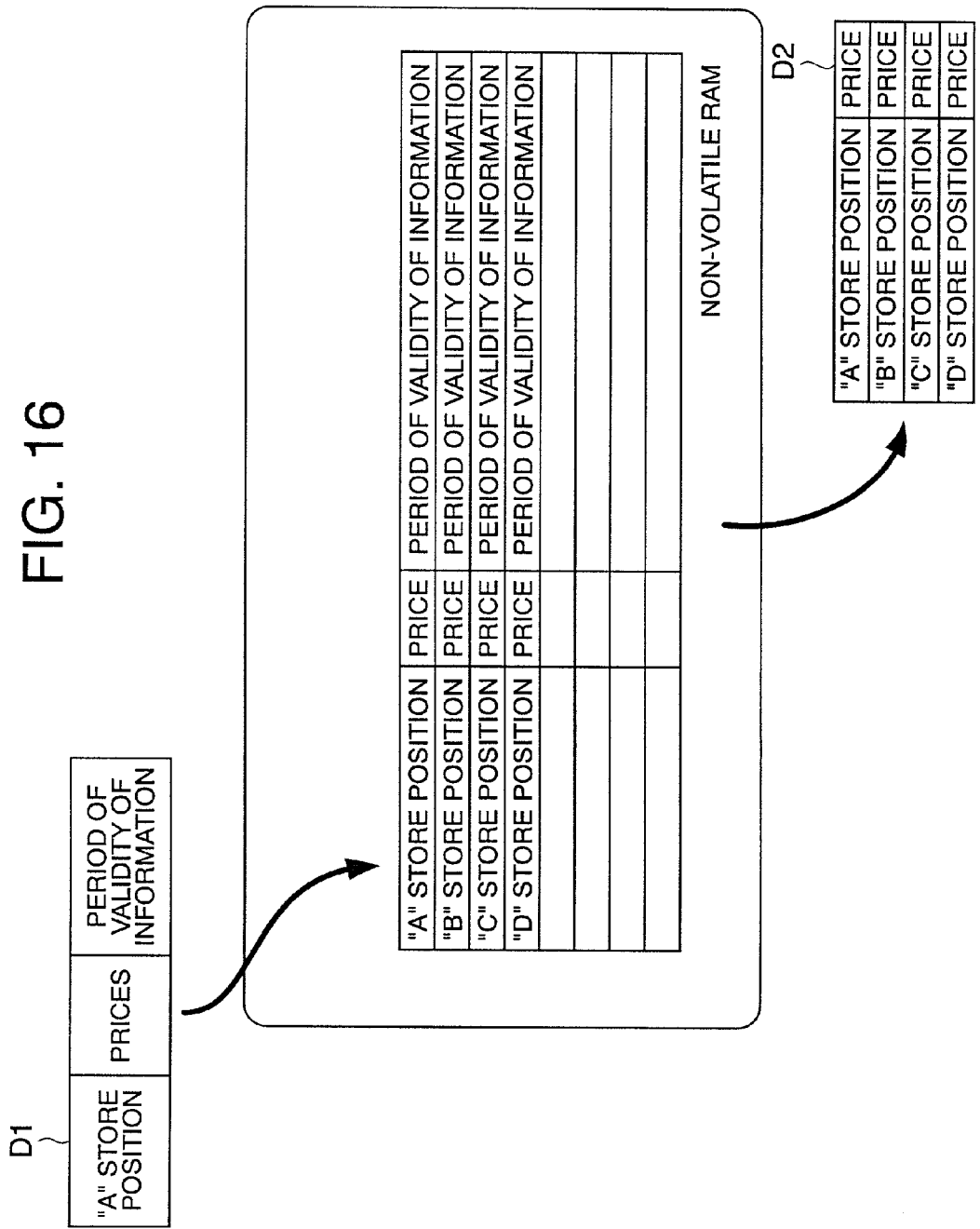
FIG. 16 is a view illustrating the operation of a store listing means in the third embodiment of the present invention.

The store listing means 103b is provided inside the on-board side system 15 depicted in the apparatus configuration of FIG. 15. Operations will be described with reference to FIG. 16. The on-board side system 15 stores the store information (the data D1 in FIG. 16) received by the store information transmitting means 101b in a storage region. In addition, each piece of store information is checked every constant period so that the data on which the period of validity has expired are deleted. Moreover, distances between the positions of stores having been listed in a constant period and the position of the system-mounted vehicle are calculated so that, if the above-described distances are not less than the distance having been set in advance, the data in question is deleted.

In addition, in the case where the storage region is already full when store information is newly received, distances between the store positions and the system-mounted vehicle are calculated respectively on the store information stored in the storage region so that the one with the largest distance is deleted and the above-described newly received store information is stored in the region after deletion. When the purchaser considers purchasing goods (Procedures 1 to 3 in FIG. 13), the store information (the data D2 in FIG. 16) is listed and outputted.

The route guiding means 105b is provided inside the on-board side system 15 as shown in the apparatus configuration of FIG. 15. When the purchaser has set a destination in the on-board side system 15 with the destination setting means 1053 (reference should be made to FIG. 20), the route guiding control means 1055 calculates the route from the current position identified by the position identifying means 1052 to the above-described set destination with a map database 1051, proceeds with route guiding to the purchaser with the guidance display means 1054 and outputs to the required-time calculating means 119b and the movement costs calculating means 107, while taking the current position and the destination as the departure point and the destination, respectively. Incidentally, the map database 1051 is also used as a database when the time required is calculated with required-time calculating means 119b to be described below and when the movement costs are calculated with the movement costs calculating means 107b.

Figure 17:
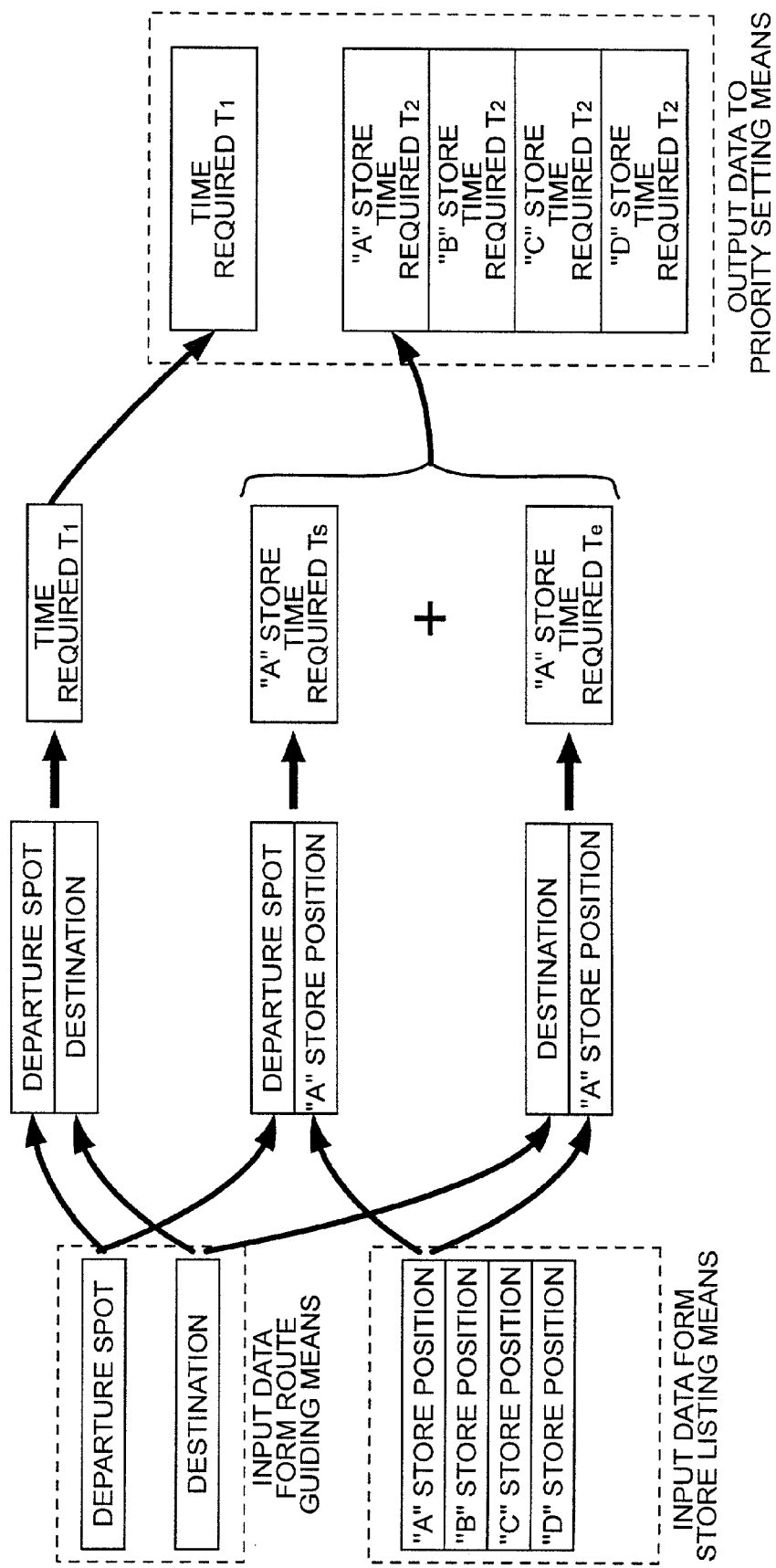
FIG. 17 is a view illustrating the operation of a means for calculating time required in the third embodiment of the present invention.

The required-time calculating means 119b is provided inside the on-board side system 15 depicted in the apparatus configuration of FIG. 15. Operations will be described with reference to FIG. 17. As shown in FIG. 17, the required-time calculating means 119b calculates the required time $T_1$ from the departure point set by the route guiding means 105b to the destination to be outputted to the priority setting means 109b, and calculates the times required $T_s$ from the departure point set by the route guiding means 105b to respective stores and the times required $T_e$ from respective stores to the destination on respective positions of stores outputted from the store listing means 103b to sum the given times required $T_s$ and $T_e$, and obtains the times required $T_2$ in case of visiting respective stores to be outputted to the priority setting means 109b. Each time required is calculated with the map database 1051 that is also used in the route guiding means 105b.

Figure 18:
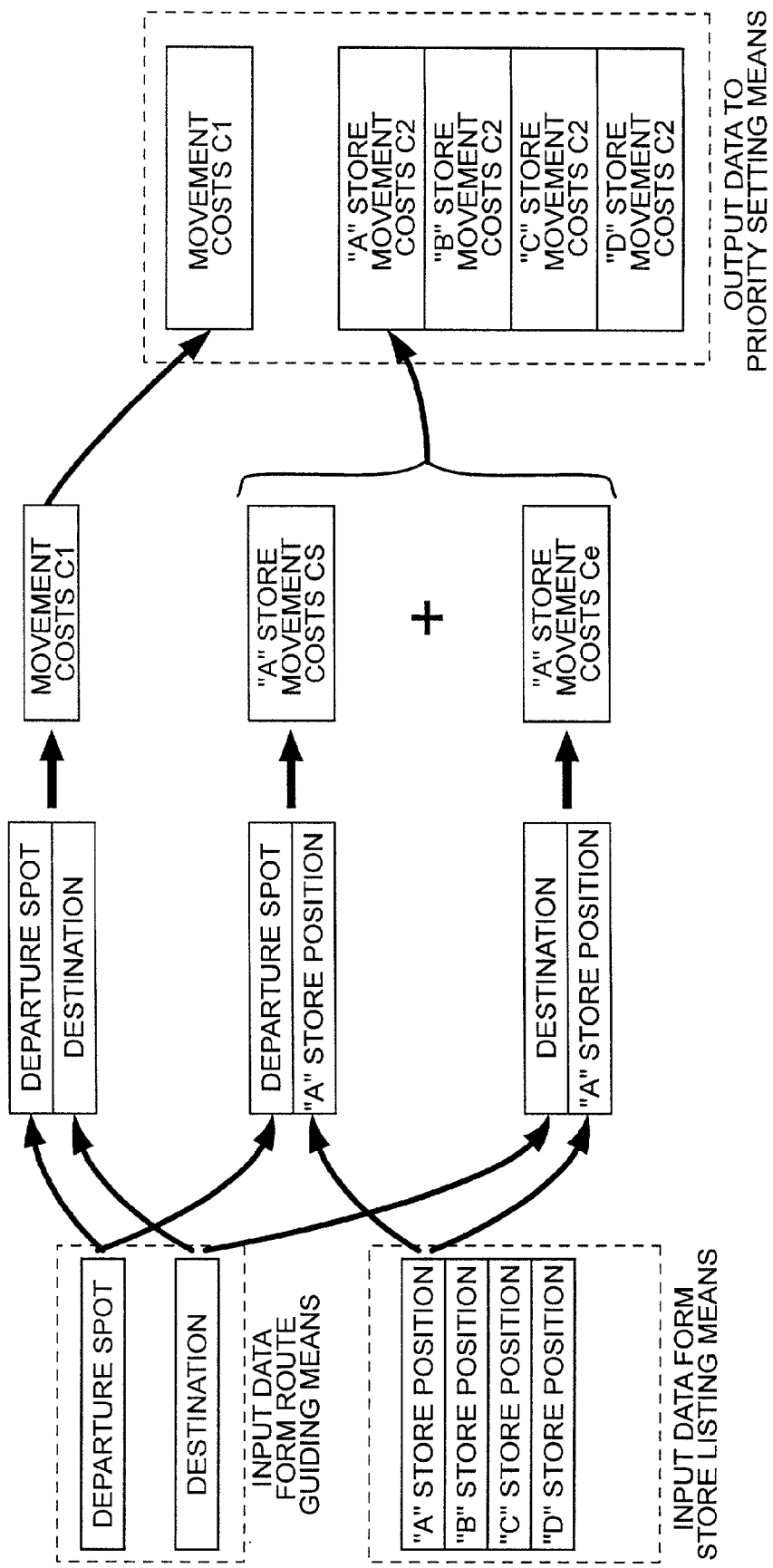
FIG. 18 is a view illustrating the operation of a means for calculating movement costs in the third embodiment of the present invention.

The movement costs calculating means 107b is provided inside the on-board side system 15 shown in the apparatus configuration of FIG. 15. Operations will be described with reference to FIG. 18. As shown in FIG. 18, the movement costs calculating means 107b calculates the movement costs $C_1$ from the departure point set by the route guiding means 105b to the destination to be outputted to the priority setting means 109b, and calculates the movement costs $C_s$ from the departure point set by the route guiding means 105b to respective shops and the movement costs $C_e$ from respective shops to the destination on respective positions of stores outputted from the store listing means 103b to sum the given movement costs $C_s$ and $C_e$, and obtains the movement costs $C_2$ in case of visiting respective shops to be outputted to the priority setting means 109b. As a method for calculating movement costs, there is a method to calculate the distance of each route, for example with the map database 1051 also used in the route guiding means 105b, and moreover to calculate the required amount of fuel by dividing the calculated distance with the average mileage of the system-mounted vehicle and then multiplying by the unit price of fuel to be purchased for the required amount of fuel thus calculated.

The weighting setting means 121b is provided inside the on-board side system 15 depicted in the apparatus configuration of FIG. 15. Operations will be described as follows. The weighting setting means 121b causes the purchaser to select whether he/she regards costs as important or regards time as important at the occasion the purchaser considers purchasing goods (Procedure 2 in FIG. 13). If the purchaser regards costs as important, weighting $W_c$ toward the level of priority on costs is set larger than normal one, or weighting $W_t$ toward the level of priority on time is set smaller than normal one. In addition, if the purchaser regards time as important, weighting $W_c$ toward the level of priority on costs is set smaller than normal one, or weighting $W_t$ toward the level of priority on time is set larger than normal one.

Incidentally, a normal value of weighting $W_c$ toward the level of priority on costs and weighting $W_t$ toward the level of priority on time is set to a value with which a general purchaser feels that the costs and time are balanced. For example, with weighting $W_c=1$ being set toward the level of priority on costs and with wages per unit hour for an average worker being set to weighting $W_t$ toward the level of priority on time being given, weighting where the time and costs are balanced can be set for an average worker.

Figure 19:
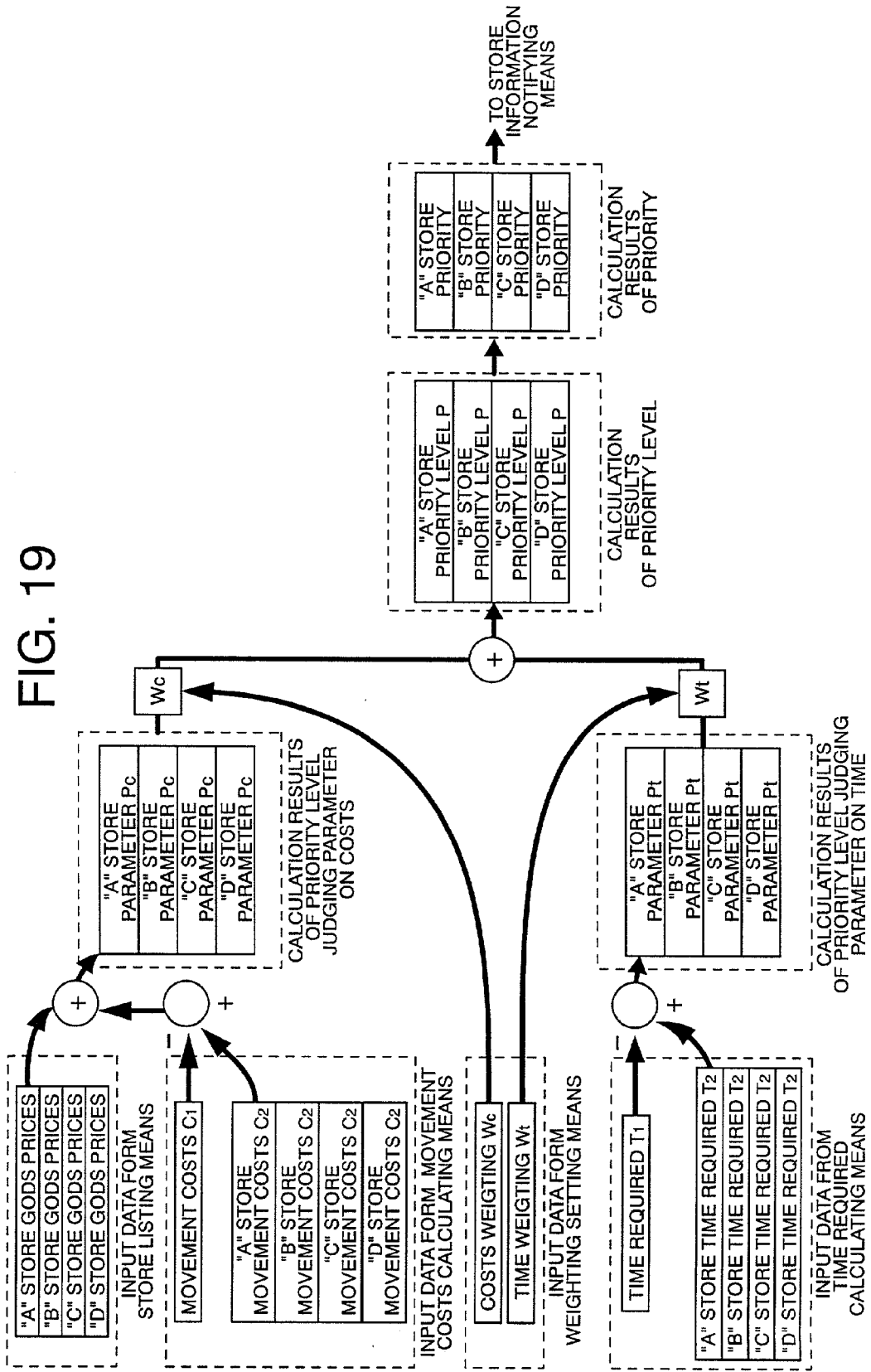
FIG. 19 is a view illustrating the operation of a means for setting priority in the third embodiment of the present invention.

The priority setting means 109b is provided inside the on-board side system 15 shown in the apparatus configuration of FIG. 15. Operations will be described with reference to FIG. 19. The prices of the goods in respective stores outputted from the store listing means 103b, and the difference between the movement cost $C_2$ when respective stores outputted from the movement costs calculating means 107b are visited and the movement cost $C_1$ in case of direct movement from the departure spot to the destination are summed to calculate a priority level judging parameter $P_c$ on costs. In addition, a priority level judging parameter $P_t$ on time is calculated from a difference between the required time $T_2$ in case of visiting respective stores outputted from the required time calculating means 119b and the required time $T_2$ in case of direct movement from the departure spot to the destination $T_1$, that is, an increased time required.

Next, the one given by multiplying the priority level judging parameter $P_c$ with the cost weighting $W_c$ outputted from the weighting setting means and the one given by multiplying the priority level judging parameter $P_t$ with the time weighting $W_t$ outputted from the weighting setting means are summed to give the priority level P. In addition, those with less cost priority level are given higher priority and are outputted to the store information notifying means 111b.

The store information notifying means 111b as well as the purchase intention confirming means 115b is provided inside the on-board side system 15 shown in the apparatus configuration of FIG. 15. Operations will be described as follows. The prices for goods on respective stores and the positions of the stores outputted from the store listing means 103b are informed with voice according to the priority outputted from the priority setting means 109b (Procedure 3 in FIG. 13). At the time of informing of each shop, a voice inquires whether or not that store is selected and in response thereto the purchaser tells the intention of YES/NO with voice. The system judges the intention of YES/NO with speech recognition. If that store is selected, the step goes forward to Procedure 4 so as to confirm with synthetic voice and speech recognition whether there is an intention for booking. Upon confirmation on a booking intention, existence of purchase intention is notified to the booking fare charging means 113b. Unless that shop is selected, store information with next priority is informed. Guidance is repeated until a purchase intention of the purchaser is confirmed or all information is presented.

The booking fare charging means 113b includes the on-board side system 15 and the booking fare settling server 7 shown in the apparatus configuration of FIG. 15. Operations will be described as follows. When the on-board side system 15 of the booking fare charging means 113b is notified by the purchase intention confirming means 115b that there is a purchase intention, the booking fare settling server 7 side of the booking fare charging means 113b is notified of information on the purchase shop as well as the price for a good via the mobile terminal network 9a. The booking fare settling server 7 charges the booking fare to the purchaser upon receipt of a notice and sets a period of validity for the booking. When charging is normally completed, the booking fare charging certifying means 117b and the on-board system 15 side of the booking fare charging means 113b are notified that charging has been normally completed. In the on-board system 15 side, the contents of the booking and the period of validity are notified to the purchaser with synthetic voice. In addition, to the booking fare charging certifying means 117b, the vehicle plate number or registration number notified by the purchase intention confirming means 115b is also notified.

The booking fare charging certifying means 117b includes a store terminal 13, a DSRC roadside communication device 17 in the store premises and a booking fare settling server 7 as shown in the apparatus configuration of FIG. 15. Operations will be described as follows. When it is notified that the charging has been normally completed by the booking fare charging means 113b, the contents of the booked goods, the period of validity of the booking and the vehicle plate number or registration number are stored. Upon arrival of the system-mounted vehicle that has booked purchase to the store, the vehicle plate number or registration number is notified to the store terminal 13 side with DSRC communications. The store terminal 13 inquires the booking fare settling server 7 of existence/non-existence of and contents of the booking corresponding to the notified vehicle plate number or registration number via the network 1. The booking fare settling server 7 confirms the corresponding booking existence/non-existence or contents thereof with the storage data in response to the inquiry. If there exists the corresponding storage data, the booking contents are notified to the store terminal 13 and the corresponding booking is deleted from the storage.

Incidentally, without utilizing synthetic voice and speech recognition, the processing described so far may be executed by displaying on the display screen of the on-board terminal of the on-board side system 15 and by key inputting of the purchaser as in the above-described embodiments.

With the construction described above, purchase of goods proceeds according to the flow shown in FIG. 13. Describing this according to Procedures 1 to 5 in FIG. 13, in Procedure 1 at first, a purchaser riding in a vehicle says "I would like to replenish gasoline" with voice to a mobile terminal (not shown in particular) of an on-board side system 15. Then, in Procedure 2, the terminal comes to inquire via voice "Do you prefer a closer (i.e., shorter in distance) one? Or do you prefer a cheaper one?" and then the purchaser tells which to put importance, on price or time.

Then, in Procedure 3, the terminal gets back to inquire via voice "How about the store A? XXX yen per liter of gasoline, and the time required is XXX minutes.", so that a store is selected by "OK!" or "Is there any other one?". Then, in Procedure 4, the terminal gets back to confirm via voice "May the store A be booked? XXX yen per liter of gasoline, and the time required is XXX minutes. ", so that an intention on booking is expressed by "OK!". Thus, in Procedure 5, the purchaser visits the store by car and can purchase gasoline.

As having been described in the foregoing, according to the present invention, a purchaser can select the store to purchase according to a store list listed in advance in order of less costs necessary for obtaining goods with the system, and therefore the purchaser can easily know the store that costs less to purchase goods without executing complicated searching operations.

In addition, since the purchaser can select the store for purchase from the store list listed in advance with the system in order of shorter time required necessary for obtaining goods, the purchaser can easily know the stores with shorter time required necessary to purchase goods without executing complicated searching operations.

Moreover, the purchaser selects the store to purchase goods by trading off between the costs necessary for obtaining goods and the time required necessary for obtaining the goods. According to the present invention, since stores are given priority in consideration of both of the costs necessary for obtaining goods and the time required necessary for obtaining the goods, the purchaser can know the store corresponding to the desire of the purchaser at earlier convenience compared with the case where prioritization is proceeded only one of the costs necessary for obtaining goods and the time required necessary for obtaining the goods.

Further, when the purchaser judges trading off of the costs necessary for obtaining goods and the time required for obtaining the goods, it depends on circumstances on which of the costs and the time required importance should be placed. For example, in case of urgency, time will become more important while costs will become more important in case of little urgency. According to the present invention, since the purchaser can set on which of the costs and the time required to put importance according to circumstances, stores corresponding to the desire of the purchaser can be known at earlier convenience as compared with the case where weighting on the costs and the time required has been fixed.

Furthermore, according to the present invention, when a store side tries to notify a purchaser of the information of the store in question as the store information with higher priority, it will do if the price is set cheap. However, even if the price at a first store is set cheap, if the purchaser incurs higher costs required for him/her to visit the first store in spite of the fact the price is set cheap, the information on a second store, which costs less than the price at the first store to which the cost required for the purchaser to visit the first store is added, is notified to the purchaser with higher priority even though the price is set higher at the second store than at the first store. Moreover, it can be considered to set a cheaper price, which is not preferable in terms of profits of stores since a cheap price less than necessity will be offered to a purchaser who is in the vicinity of the stores and incurs low costs required for visiting the stores. According to the present invention, however, cheaper prices are set to purchasers who incur higher costs required for movements to the stores, and store information of the stores is notified with higher priority so that purchaser's visits to the stores can be urged, whereas normal prices can be set to purchasers who incur lower costs required for movements to the stores, and to whom store information of the stores is notified with higher priority without setting cheaper prices.

Still further, in comparison with a case where respective stores provide with store information transmitting means, the system can be constructed inexpensively.

Additionally, the system is constructed such that the area for transmission is limited to the vicinity of stores so as to permit the store information to be transmitted to only purchasers passing in the vicinity of the stores. Thus, the percentage of the communication lines being occupied by unnecessary information transmission can be reduced.

Besides, even if either the store information transmitting means is a means for taking only a certain limited area as a transmission range or is a means for transmitting store information only at a certain limited timing, if there is an opportunity for a purchaser to receive the store information even once, listing of the store information to the purchaser can be executed and opportunities to notify the purchaser of the store information can be increased.

In addition, such events can be suppressed that the store information stored in the store information storage means will differ from actual information after a lapse of time, and wrong store information different from actuality at the time of listing is used for judging the level of priority or wrong information is notified to purchasers.

Moreover, such events can be suppressed that the store information transmitted to a certain specific area is listed by the storage means also after a purchaser departs the specific area and unnecessary information is notified to the purchaser.

Further, information that purchasers need will be able to be provided in a limited storage capacity.

Furthermore, a purchaser can purchase goods easily and in the case where a purchaser does not come to receive booked goods, a booking fare can cover the disadvantage that incurs the store side because of keeping the goods for that purchaser.

Still further, such events can be suppressed that the goods which the store side prepared after booking of the goods are left alone for a long period without a purchaser coming to receive, resulting in a loss of value of goods (in case of foods such as fast food, etc.) or the storage costs on the goods being incurred not less than necessity.

While the invention has been described in terms of preferred embodiments, those skilled in the art will recognize that the invention can be practiced with modifications within the spirit and scope of the appended claims.

What is claimed is:

1. A sales supporting system associated with a navigation system to provide store information, said sales supporting system comprising:
   store information transmitting means for transmitting store information including information on at least goods and prices that stores are dealing in, and positions of the stores;
   means for guiding routes to destinations that purchasers set optionally;
   means for calculating costs $C_1$ necessary for movements to the destinations and predicted values of required times $T_1$ necessary for movements to the destinations;
   store listing means for listing stores that deal in goods for desired purchase according to inputs of the purchasers based on the store information transmitted by said store information transmitting means;
   means for calculating costs $C_2$ necessary for movements to the destinations via the listed stores respectively and the predicted values of required times $T_2$ necessary for movements to the destinations via the listed stores respectively;
   means for calculating priority level judging parameters $P_c$ on costs, in the case where a route undergoes changes, based on sums of balances between the costs $C_2$ subject to route changes and the costs $C_1$ prior to route changes and prices of the goods;
   means for calculating priority level judging parameters $P_t$ on time from increased portions of required times given by the required times $T_1$ and $T_2$;
   priority setting means for calculating comprehensive priority level judging parameters P according to a formula $P=W_c \times P_c + W_t \times P_1$ with weighting $W_c$ toward priority levels on costs and weighting $W_t$ toward priority levels on time that are set in advance, to give higher priority to stores for purchase in order of smaller comprehensive priority level judging parameters P; and
   means for notifying the purchasers of store information based on the set priority.

2. The sales supporting system associated with a navigation system according to claim 1, said sales supporting system further comprising means for enabling the purchasers to set both or either one of weighting $W_c$ toward priority levels on costs and weighting $W_t$ toward priority levels on time in accordance with situations.

3. A sales supporting system associated with a navigation system to provide store information, said sales supporting system comprising:
   store information transmitting means for transmitting store information including information on at least goods and prices that stores are dealing in, and positions of the stores;
   means for guiding routes to destinations that purchasers set optionally;
   store listing means for listing stores that deal in goods for desired purchase according to inputs of the purchasers based on the store information transmitted by said store information transmitting means;
   means for calculating costs $C_2$ necessary for movements to the destinations via the listed stores respectively;

priority setting means for calculating priority level judging Parameters P from sums of the costs $C_2$ and prices of the goods to give higher priority to stores for purchase in order of smaller priority level judging parameters P; and means for notifying the purchasers of store information based on the set priority, wherein said store listing means comprises store information storage means for storing the store information transmitted from said store information transmitting means, and said store listing means lists stores that are dealing in goods for desired purchases from the store information stored in said store information storage means, and wherein said store information storage means comprises: means for counting distances that the purchasers move from the time when the store information is transmitted from said store information transmitting means or from the time when said store listing means receives the store information; and means for disposing of, among the store information stored, pieces of store information for which said distances exceed a threshold value set in advance.

4. A sales supporting system associated with a navigation system to provide store information, said sales supporting system comprising:

store information transmitting means for transmitting store information including information on at least goods and prices that stores are dealing in and positions of the stores;

means for guiding routes to destinations that purchasers set optionally;

store listing means for listing stores that deal in goods for desired purchase according to inputs of the purchasers based on the store information transmitted by said store information transmitting means;

means for calculating costs $C_2$ necessary for movements to the destinations via the listed stores respectively;

priority setting means for calculating priority level judging parameters P from sums of the costs $C_2$ and prices of the goods to give higher priority to stores for purchase in order of smaller priority level judging parameters P; and means for notifying the purchasers of store information based on the set priority, wherein said store listing means comprises store information storage means for storing the store information transmitted from said store information transmitting means, and said store listing means lists stores that are dealing in goods for desired purchases from the store information stored in said store information storage means, and wherein said sales supporting system further comprises means for specifying current positions of the purchasers, wherein said store information storage means comprises: means for giving distances between the current positions of the purchasers and the stores based on information on the current positions of the purchasers, which are given by said means for specifying current positions of the purchasers, and positions of the stores included in the store information; and means for deleting, among the store information stored, pieces of store information for which said distances exceed a threshold value set in advance.

5. A sales supporting system associated with a navigation system to provide store information, said sales supporting system comprising:

store information transmitting means for transmitting store information including information on at least goods and prices that stores are dealing in and positions of the stores;

means for guiding routes to destinations that purchasers set optionally;

store listing means for listing stores that deal in goods for desired purchase according to inputs of the purchasers based on the store information transmitted by said store information transmitting means;

means for calculating costs $C_2$ necessary for movements to the destinations via the listed stores respectively;

priority setting means for calculating priority level judging parameters P from sums of the costs $C_2$ and prices of the goods to give higher priority to stores for purchase in order of smaller priority level judging parameters P; and means for notifying the purchasers of store information based on the set priority, wherein said store listing means comprises store information storage means for storing the store information transmitted from said store information transmitting means, and said store listing means lists stores that are dealing in goods for desired purchases from the store information stored in said store information storage means, and wherein said sales supporting system further comprises means for specifying current positions of the purchasers, wherein said store information storage means comprises: store-to-purchaser distance calculation means for giving distances between the current positions of the purchasers and the stores based on information on the current positions of purchasers, which are given by said means for specifying current positions of the purchasers, and positions of the stores included in the store information; means for comparing the largest distance among the distances of the currently stored store information given by said store-to-purchaser distance calculation means with the distance of newly received store information given by said store-to-purchaser distance calculation means when a region to store information is fulfilled; and means for deleting from storage a piece of information of the largest distance given by said store-to-purchaser distance calculation means among the distances of the store information currently stored so as to store newly received store information in the case where the distance of the newly received store information is smaller than or equal to any of the distances of the store information currently stored.

6. A sales supporting method associated with a navigation system to provide store information, said method comprising;

a step of transmitting store information including information on at least goods and prices that stores are dealing in, and positions of the stores;

a step of guiding routes to destinations that purchasers set optionally;

a step of calculating costs $C_1$ necessary for movements to the destinations and predicted values of required times $T_1$ necessary for movements to the destinations;

a step of listing stores that deal in goods for desired purchase according to inputs of the purchasers based on the store information transmitted by said store information transmitting step;

a step of calculating costs $C_2$ necessary for movements to the destinations via the listed stores respectively and predicted values of required times $T_2$ necessary for movements to the destinations via the listed stores respectively;

a step of calculating priority level judging parameters $P_c$ on costs, in the case where a route undergoes changes, based on sums of balances between the costs $C_2$ subject to route changes and the costs $C_1$ prior to route changes and prices of the goods;

a step of calculating priority level judging parameters $P_t$ on time from increased portions of required times given by the required times $T_1$ and $T_2$;

a step of calculating comprehensive priority level judging parameters P according to a formula $P = W_c \times P_c \times W_t \times P_t$ with weighting $W_c$ toward priority levels on cost and weighting $W_t$ toward priority levels on time that are set in advance, to give higher priority to stores for purchase in order of smaller comprehensive priority level judging parameters P; and a step of notifying the purchasers of store information based on the set priority.

* * * * *